United States Patent
Ueno

(10) Patent No.: US 7,931,851 B2
(45) Date of Patent: Apr. 26, 2011

(54) STEREOLITHOGRAPHIC METHOD AND APPARATUS

(75) Inventor: Takakuni Ueno, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 865 days.

(21) Appl. No.: 10/570,232

(22) PCT Filed: Sep. 10, 2004

(86) PCT No.: PCT/JP2004/013565
§ 371 (c)(1),
(2), (4) Date: Feb. 28, 2006

(87) PCT Pub. No.: WO2005/025838
PCT Pub. Date: Mar. 24, 2005

(65) Prior Publication Data
US 2007/0029706 A1    Feb. 8, 2007

(30) Foreign Application Priority Data

Sep. 11, 2003 (JP) .............................. P2003-319572

(51) Int. Cl.
*B29C 35/04* (2006.01)

(52) U.S. Cl. ..................................... 264/401; 425/174.4

(58) Field of Classification Search .................. 264/401; 425/174.4
See application file for complete search history.

(56) References Cited

U.S. PATENT DOCUMENTS

| | | | |
|---|---|---|---|
| 3,718,396 A * | 2/1973 | Hennings | 355/43 |
| 5,738,817 A | 4/1998 | Danforth et al. | |
| 5,900,207 A | 5/1999 | Danforth et al. | |
| 6,085,122 A * | 7/2000 | Manning | 700/212 |
| 6,264,873 B1 * | 7/2001 | Gigl et al. | 264/401 |
| 6,461,797 B1 * | 10/2002 | Lercel et al. | 430/318 |
| 6,500,378 B1 * | 12/2002 | Smith | 264/401 |
| 6,627,376 B1 * | 9/2003 | Ueno | 430/269 |
| 7,137,801 B2 | 11/2006 | Ueno | |
| 2002/0149137 A1 * | 10/2002 | Jang et al. | 264/494 |

FOREIGN PATENT DOCUMENTS

| | | |
|---|---|---|
| EP | 0590956 A1 | 4/1994 |
| EP | 1057615 A2 * | 12/2000 |
| EP | 1077125 A1 | 2/2001 |
| EP | 1192041 B1 * | 3/2003 |
| EP | 1344633 A1 | 9/2003 |
| JP | 03-281329 A | 12/1991 |
| JP | 04-301431 A | 10/1992 |
| JP | 04-305438 A | 10/1992 |
| JP | 07-290578 A | 11/1995 |
| WO | 92/20505 A1 | 11/1992 |
| WO | 94/23936 A1 | 10/1994 |

* cited by examiner

*Primary Examiner* — Philip C Tucker
*Assistant Examiner* — Amjad Abraham
(74) *Attorney, Agent, or Firm* — Panitch Schwarze Belisario & Nadel LLP

(57) ABSTRACT

A method and an apparatus includes using a planar plotting mask which can continuously change a mask image; continuously moving the planar plotting mask with reference to the surface of the photocurable resin composition and exposing the surface of a photocurable resin composition to light by way of the planar plotting mask while continuously changing a mask image of the planar plotting mask in accordance with a cross-sectional profile pattern of an optically-cured resin layer to be formed and in synchronism with movement of the planar plotting mask, to thus form an optically-cured resin layer having a predetermined cross-sectional profile pattern; and performing building operation such that boundary areas among adjacent plotted areas in the optically-cured resin layer become unnoticeable in a finally-obtained stereolithographic three-dimensional object.

9 Claims, 10 Drawing Sheets

STEREOLITHOGRAPHIC METHOD AND APPARATUS

CROSS-REFERENCE TO RELATED APPLICATION

This application is a Section 371 of International Application No. PCT/JP2004/013565, filed Sep. 10, 2004, which was published in the Japanese language on Mar. 24, 2005, under International Publication No. WO 2005/025838 A1, the disclosure of which is incorporated herein by reference.

TECHNICAL FIELD

The present invention relates to a stereolithographic method and a stereolithographic apparatus, which use a photocurable resin composition. In more detail, the present invention relates to a stereolithographic method and a stereolithographic apparatus for manufacturing a stereolithographic three-dimensional object from a photocurable resin composition with high building accuracy, at high building speed, and with superior productivity, wherein none of undesirable lines, streaks, and ridges appear in the surface of the three-dimensional object, and the three-dimensional object has superior appearance and dimensional accuracy and is free from unevenness in strength and hardness. In the case of the present invention, various types of stereolithographic three-dimensional objects from a small one to a large one can be smoothly manufactured.

BACKGROUND ART

Recently, a stereolithographic method and apparatus for manufacturing a stereolithographic three-dimensional object by means of curing a photocurable resin on the basis of data input a three-dimensional CAD system has been put into practical use. This stereolithography technique gets a lot of attentions, because a complicate three-dimensional object, such as a model used for verifying an external design during the course of designing operation, a model used for checking the functionality of a component, or a base model used for making a plastic or metal mold for use in manufacturing a casting mold, can be built readily.

A method using a mold bath is used for general purpose at the time of manufacture of a three-dimensional object by the stereolithography. A method widely adopted as procedures of that method comprises the process steps of: putting a liquid photocurable resin into a mold bath; selectively radiating a spot-shaped UV laser beam, which is controlled by a computer so as to obtain a desired pattern on the surface of the liquid, to thus optically cure the resin to a predetermined thickness to thereby form a cured resin layer; downwardly moving the cured resin layer within the mold bath to cause the photocurable resin liquid in the mold bath to flow above the cured resin layer to thereby form a layer of the photocurable resin liquid; radiating the spot-shaped UV laser beam to the photocurable resin liquid layer, to thereby form a cured resin layer; and repeating the above processes until a stereolithographic three-dimensional object of predetermined shape and size is formed.

However, the above-described conventional method employing the spot-shaped UV laser beam is a so-called stippling method for forming a planar optically-cured pattern by means of radiating, in a moving manner; one spot-shaped laser beam onto the surface of a photocurable resin; and has problems of building involving consumption of much time and low productivity. Moreover, a UV laser system used as the light source is extremely expensive, which makes the stereolithographic apparatus of this type expensive.

With a view toward solving the previously-described drawbacks of the conventional technique, a stereolithographic method has been proposed (see JP-A-4-305438), wherein a linear exposure mask where optical shutters, each being capable of controlling shielding of light in a microdot area, are continuously arranged in a line is used, to thus control the optical shutters according to predetermined horizontal cross-sectional profile data by means of scanning the exposure mask in a direction orthogonal to the arranged direction of the optical shutters, thereby sequentially forming one layer of optically-cured resin layer. In the case of adoption of this method, using an expensive UV laser system as the light source is not always required, and an inexpensive light source such as an ordinary UV lamp can be used. When compared with the conventional method employing the spot-shaped UV laser beam, this method enables an increase in building rate. However, this method is a scheme where lines of linear optically-cured sections are formed one by one in the scanned direction of a photo-mask and where a cross-sectional profile pattern for one layer is formed by means of repeating, a plurality of times, formation of the linear optically-cured section. If the scan speed of the photo-mask is increased, an optically-cured section that is sufficiently cured cannot be formed on a per-line basis. Therefore, the photo-mask must be slowly scanned. Moreover, this method is to form a planar optically-cured layer by means of making an optically-cured section one after another on a per-line basis, which involves consumption of much time for building the entire article. Therefore, the building rate cannot be said to be sufficiently fast, and sufficient satisfaction cannot be achieved in view of productivity.

Another known method for manufacturing a stereolithographic three-dimensional object repeats the processing steps of: fixedly placing a planar plotting mask between a light source and the surface of a photocurable resin composition, the mask being provided with a liquid-crystal shutter capable of shielding and passing light through microdot areas; forming a predetermined mask pattern on the planar plotting mask in accordance with a cross-sectional profile pattern of one layer to be formed with the planar plotting mask remaining stationary; exposing the surface of the photocurable resin composition to light by way of the mask pattern to thus cure the photocurable resin composition, thereby forming a cross-sectional profile pattern of the layer; supplying a photocurable resin composition of one layer over the optically-cured cross-sectional profile pattern; forming the next predetermined mask pattern on the planar plotting mask in accordance with a cross-sectional profile pattern of one layer to be formed with the planar plotting mask remaining stationary; and exposing the surface of the photocurable resin composition to light by way of the mask pattern to thus cure the photocurable resin composition for the next one layer, thereby forming a cross-sectional profile pattern of the layer.

According to this method, the surface of the photocurable resin composition is exposed to light, thereby forming, in a planar manner, the optically-cured cross-sectional profile pattern of one layer by means of a single operation. Therefore, the optical building speed can be increased when compared with the previously-described conventional method using the spot-shaped UV laser and the method described in JP-A-4-305438, which has been referred to previously and employs the line-shaped exposure mask comprising the optical shutters capable of controlling a shield of light of the microdot areas which are continuously arranged in a line.

When a stereolithographic three-dimensional object is manufactured by this method, an interval between adjacent microdot areas that are projected from the planar plotting mask on the surface of the photocurable resin composition is required to be 0.1 mm or less, from the viewpoint of building accuracy (resolution). Therefore, for instance, a small article whose building area size measures 250 mm by 250 mm requires a number of pixels about 2500 by 2500 dots at least. In the case of a middle-size article whose building area measures 600 mm by 600 mm, the number of pixels required is about 6000 by 6000 dots. However, liquid-crystal masks (liquid-crystal shutters) or digital micromirror shutters, which realize such the high resolutions, are not currently available, or extremely expensive even if available.

Under the method for effecting exposure with the fixedly-positioned planar plotting mask being stopped, the degree of accuracy of an exposed profile pattern is determined by the degree of accuracy (roughness) of the planar plotting mask and the scale-up or scale-down factor of a pattern projected on the surface of the photocurable resin composition by way of the planar plotting mask. The smaller the scale-up factor (the greater the scale-down factor) is set, the smaller the distance becomes between optical dots on the surface of the photocurable resin composition, so that the degree of accuracy of the cross-sectional profile pattern is enhanced. Meanwhile, the greater the scale-up factor is set, the greater the distance becomes between the optical dots on the surface of the photocurable resin composition, so that the degree of accuracy of the cross-sectional profile pattern is decreased.

Therefore, in the case of this method under which the planar plotting mask is fixedly arranged, difficulty is encountered, under the present circumstances, in manufacturing a large-size, stereolithographic three-dimensional object having an enhanced degree of accuracy (building accuracy), and the method can be applied solely to manufacture of a small-size stereolithographic three-dimensional object, in view of the degree of accuracy (building accuracy).

With a view toward solving the drawbacks in the method using a fixedly-arranged planar plotting mask and enabling manufacture of a large-size, stereolithographic three-dimensional object by use of a small-size liquid-crystal shutter, the following method has been proposed (JP-A-8-112863). This method is for manufacturing a stereolithographic three-dimensional object by repeating the processing steps of: arranging a liquid-crystal shutter (a liquid-crystal mask), which selectively passes and shields transmission of light, so as to allow the light to travel in parallel with the surface of a photocurable resin liquid; dividing a travel range of the liquid-crystal shutter into a plurality of sub-divided areas; moving the liquid-crystal shutter to a sub-divided first area of the travel range and stopping the shutter in that position; radiating light from a light source provided on the back of the liquid-crystal shutter, the shutter remains stationary, to the surface of the photocurable resin by way of the liquid-crystal shutter while the light source is being shifted within the range of the liquid-crystal shutter, to thus form a cured area corresponding to the sub-divided first area; moving the liquid-crystal shutter to a sub-divided second travel area and stopping the liquid-shutter in that position, and radiating light from the light source provided on the back of the liquid-crystal shutter, the shutter remains stationary onto the surface of the photocurable resin by way of the liquid-crystal shutter while the light source is being shifted within the range of the liquid-crystal shutter, to thus form a cured area corresponding to the sub-divided second area; performing the same operation until a predetermined cross-sectional profile pattern of one layer is formed on the surface of the photocurable resin composition; and repeating these processing steps until a predetermined stereolithographic three-dimensional object is formed. However, in the case of the method described in JP-A-8-112863, a cured cross-sectional profile pattern of one layer is formed by means of repeating operations; namely, operation for moving the liquid-crystal shutter to the sub-divided first travel area; operation of exposing the surface of photocurable resin with the liquid-crystal shutter remaining stationary (forming an optically-cured area on the surface of photocurable resin); operation of moving the liquid-crystal shutter to the sub-divided second travel area; and operation of exposing the surface of the photocurable resin with the liquid-crystal shutter remaining stationary (forming an optically-cured area on the surface of the photocurable resin). A stereolithographic three-dimensional object is manufactured by means of repeating these operations for a plurality of layers. When the liquid-crystal shutter has already moved to each of the plurality of sub-divided travel areas, radiation of light is not carried out. Therefore, under this method, exposure is performed not continuously but intermittently, and hence building speed becomes slow. Further, under this method, the travel range of the liquid-crystal shutter is divided into a plurality of sub-divided areas, and the photocurable resin composition is cured with the liquid-crystal shutter remaining stationary in each of the sub-divided areas. The cured state is likely to become discontinuous or non-uniform in a border between the sub-divided travel areas. As a result, unevenness in the strength of the entire stereolithographic three-dimensional object, insufficient strength, unsatisfactory appearance, and a drop in dimensional accuracy are likely to arise.

DISCLOSURE OF THE INVENTION

The objective of the present invention is to provide a stereolithographic method and a stereolithographic apparatus, which enable manufacture of a high-quality, stereolithographic three-dimensional object at high building rate, with high building accuracy, and with superior productivity while preventing occurrence of variations in cure or strength even in the case of a large-size stereolithographic three-dimensional object, as well as in the case of a small-size or middle-size stereolithographic three-dimensional object. Particularly, the objective of the present invention is to provide a stereolithographic method and a stereolithographic apparatus, which enable manufacture of a high-quality, stereolithographic three-dimensional object at high building rate, with high building accuracy, and with superior productivity, wherein boundary areas among adjacent plotted areas in an optically-cured resin layer do not appear in the form of lines, streaks, or ridges in a finally-obtained stereolithographic three-dimensional object, and the three-dimensional object has unnoticeable boundary areas and superior appearance and dimensional accuracy.

Another objective of the present invention is to provide a stereolithographic method and a stereolithographic apparatus, which enable smooth manufacture of a high-quality, stereolithographic three-dimensional object having a high degree of building accuracy and being free from variations in cure and strength at high building rate without use of an expensive UV laser system even when an inexpensive light source, such as an ordinary UV lamp, is used.

The present inventors have conducted considerable research in order to attain the above-described objectives. At the time of manufacture of a stereolithographic three-dimensional object by means of exposing the surface of a photocurable resin composition to light by way of a planar plotting mask to thus sequentially form optically-cured resin layers having a predetermined cross-sectional profile pattern, the inventors have developed another technique in place of the above-described conventional technique of effecting exposure with the planar plotting mask remaining fixed or stationary. Specifically, according to the newly-developed technique, the planar plotting mask is continuously moved during exposure in at least one of the optical building processes, and building is performed upon exposure by means of continuously moving the planar plotting mask in synchronism with the continuous movement, to thus continuously change a mask image (a mask pattern) defined by the planar plotting mask in accordance with the predetermined cross-sectional profile pattern to be formed (building is effected upon exposure by means of continuously changing the mask image of the planar plotting mask as in the case of a motion picture; e.g., a movie or a TV screen). As a result, a stereolithographic three-dimensional object can be manufactured with high building accuracy, with high quality, at higher building rate, and with superior productivity as compared with the case of the conventional technique, while preventing occurrence of variations in cure even in the case of a large-size, stereolithographic three-dimensional object as well as in the case of a small-size or middle-size three-dimensional object.

The present inventors also found the following facts. First, when the above-described optical building processes are performed so as to prevent boundary areas among adjacent plotted areas in the optically-cured resin layer from becoming noticeable in a finally-obtained stereolithographic three-dimensional object, the boundary areas among the adjacent plotted areas can be prevented from appearing in the form of lines, streaks, or ridges in a finally-obtained stereolithographic three-dimensional object. Thus, there can be obtained a stereolithographic three-dimensional object, which has superior appearance and superior dimensional accuracy and which is free from variations in strength. Second, in order to prevent the boundary areas from becoming noticeable, at least one of the following methods is effective: a method for making the total intensity of light radiated onto the boundary areas among adjacent plotted areas equal to or analogous to the intensity of light radiated onto areas other than the boundary areas; a method for making the shape of boundary areas among adjacent plotted areas curve; and a method for staggering the positions of the boundary positions between adjacent plotted areas in vertically-stacked optically-cured resin layers.

The present inventors have also found that, under the above-described method, even when an inexpensive light source, such as an ordinary UV lamp, is used without use of an expensive UV laser system, a high-quality, stereolithographic three-dimensional object, which has a high degree of building accuracy and is free from unevenness in curing, can be smoothly manufactured at high building speed.

Moreover, the present inventors have found the following facts. First, a planar plotting mask in which a plurality of micro-optical shutters, each being able to shield or pass transmission of light through a microdot area, are arranged in a planar fashion; especially, there is preferably used a planar plotting mask in which a liquid-crystal shutter or a digital micromirror shutter is arranged in a planar manner. Second, a light-condensing lens, which can be continuously moved in synchronism with the planar plotted mask, is preferably arranged between the light source and the planar plotting mask. It is also preferable to arrange a projection lens, which can be moved continuously in synchronism with the planar plotting mask between the planar plotting mask and the surface of a photocurable resin composition. The present inventors have completed the present invention on the basis of these various findings.

The present invention provides a method (1) for manufacturing a stereolithographic three-dimensional object by means of sequentially repeating, until a predetermined stereolithographic three-dimensional object is formed, optical building processes of exposing a surface of a photocurable resin composition by way of a planar plotting mask under control to thus form an optically-cured resin layer having a predetermined cross-sectional profile pattern; applying a photocurable resin composition for one layer over the optically-cured resin layer; and exposing the surface of the photocurable resin composition to light by way of the planar plotting mask under control, to thus further form an optically-cured resin layer having a predetermined cross-sectional profile pattern, the method comprising:

using a planar plotting mask, which can continuously change a mask image, as a planar plotting mask;

performing building operation of continuously moving the planar plotting mask with reference to the surface of the photocurable resin composition during at least one of the optical building processes and of exposing the surface of a photocurable resin composition to light by way of the planar plotting mask while continuously changing a mask image of the planar plotting mask in accordance with a cross-sectional profile pattern of an optically-cured resin layer to be formed and in synchronism with movement of the planar plotting mask, to thus form an optically-cured resin layer having a predetermined cross-sectional profile pattern; and performing optical building operation such that boundary areas among adjacent plotted areas in the optically-cured resin layer become unnoticeable in a finally-obtained stereolithographic three-dimensional object.

In order to make unnoticeable the boundary area between the adjacent plotted areas in the optically-cured resin layer in a finally-obtained stereolithographic three-dimensional object, the present invention provides an invention (2) based on the optical three-dimensional building method (1), wherein at least one of operations (i) to (iii) provided below is performed:

(i) operation for making a total intensity of light radiated onto boundary areas among adjacent plotted areas in an optically-cured resin layer equal or analogous to the intensity of light radiated onto areas other than the boundary areas;

(ii) operation for making the shape of the boundaries between the adjacent plotted areas in the optically-cured resin layer curve; and (iii) operation for staggering positions of the boundary areas among the adjacent plotted areas in the optically-cured resin layer in vertically-stacked optically-cured resin layers.

The present invention also provides an invention (3) based on the optical three-dimensional building method (1) or (2), wherein a planar plotting mask, in which a plurality of micro-optical shutters capable of blocking or allowing transmission of light into microdot areas are arranged in a planar manner, is used as the planar plotting mask; and the surface of the photocurable resin composition is exposed to light while a mask image is continuously changed in accordance with a cross-sectional profile pattern to be formed by means of the plurality of micro-optical shutters during continuous movement of the planar plotting mask.

The present invention provides an invention (4) based on the optical three-dimensional building method (3), wherein the planar plotting mask is a planar plotting mask where a liquid-crystal shutter or a digital micromirror shutter is arranged in a planar fashion. The present invention provides a stereolithographic apparatus (5) comprising: photocurable resin composition supply means for sequentially supplying a photocurable resin composition of one layer over a mount table or an optically-cured resin layer;

a light source;

a planar plotting mask capable of continuously changing a mask image;

moving means for continuously moving the planar plotting mask with respect to a surface of the photocurable resin composition;

means for continuously changing the mask image of the planar plotting mask in synchronism with movement of the planar plotting mask; and means for making unnoticeable boundary areas among adjacent plotted areas of optically-cured resin layers within a finally-obtained stereolithographic three-dimensional object.

The present invention provides an invention (6) based on the stereolithographic apparatus (5), wherein the means for making unnoticeable boundary areas among adjacent plotted areas of optically-cured resin layers within a finally-obtained stereolithographic three-dimensional object is means for performing at least one of operations (i) to (iii) provided below:

(i) operation for making a total intensity of light radiated onto boundary areas among adjacent plotted areas in an optically-cured resin layer equal or analogous to the intensity of light radiated onto areas other than the boundary areas;

(ii) operation for making the shape of the boundaries between the adjacent plotted areas in the optically-cured resin layer curve; and (iii) operation for staggering positions of the boundary areas among the adjacent plotted areas in the optically-cured resin layer in vertically-stacked optically-cured resin layers.

The present invention also provides an invention (7) based on the stereolithographic apparatus (5) or (6), wherein the planar plotting mask is a planar plotting mask in which a plurality of micro-optical shutters capable of blocking or allowing transmission of light into microdot areas are arranged in a planar manner;

The present invention provides an invention (8) based on any one of pieces of the stereolithographic apparatus (5) to (7), wherein the planar plotting mask is a planar plotting mask where a liquid-crystal shutter or a digital micromirror shutter is arranged in a planar manner; and The present invention provides an invention (9) based on any one of pieces of the stereolithographic apparatus (5) to (8), further comprising: a light-condensing lens which is interposed between a light source and the planar plotting mask and can be continuously moved in synchronism with the planar plotting mask; and a projection lens which is interposed between the planar plotting mask and the surface of the photocurable resin composition and which can be continuously moved in synchronism with the planar plotting mask.

In the case of the present invention, a high-quality, stereolithographic three-dimensional object where lines, streaks, and ridges do not appear in areas corresponding to boundaries among plotted areas and which has superior appearance and dimensional accuracy and is free from variations in strength can be manufactured with high building accuracy, at a higher building rate, and with superior productivity while preventing occurrence of unevenness in hardness, as compared with the case of a conventional method, through use of a comparatively-inexpensive planar plotting mask which is smaller than a predetermined cross-sectional profile pattern to be formed.

In the case of the present invention, a stereolithographic three-dimensional object can be smoothly manufactured with higher dimensional accuracy and at a higher building rate when the article is a large-size stereolithographic three-dimensional object, as well as when the article is a small-size or a middle-size stereolithographic three-dimensional object.

Moreover, in the case of the present invention, even when an inexpensive light source, such as an ordinary UV lamp, is used without use of an expensive UV laser system, the above-described high-quality, stereolithographic three-dimensional object can be smoothly manufactured at a higher building rate.

Figure 1:
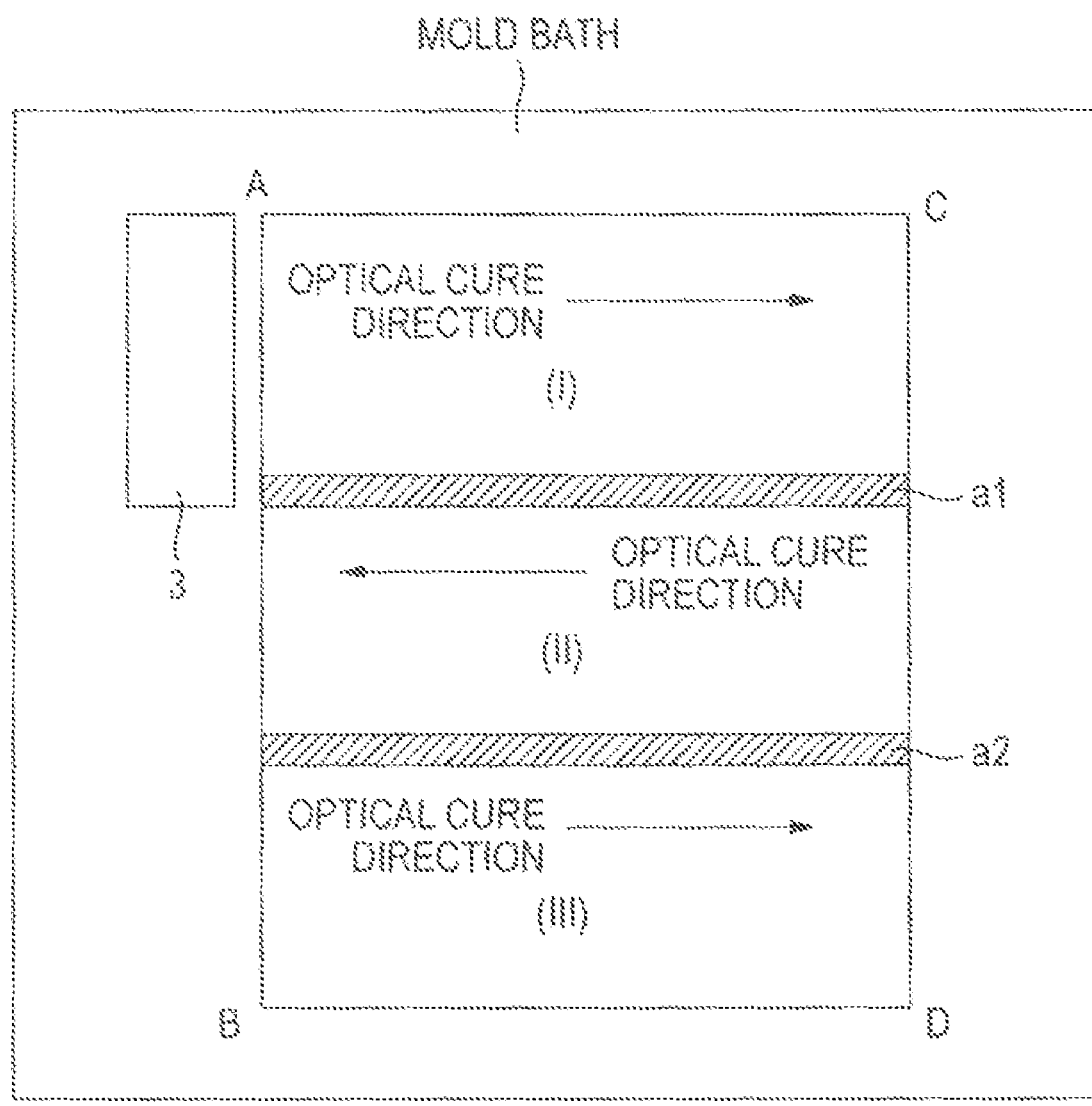
FIG. 1 is a view showing an example when there is formed a cross-sectional profile pattern having a boundary area (an overlapping area) between plotted areas.

In the drawings, reference numeral 1 designates a light source; 2 designates a light-condensing lens; 3 designates a planar plotting mask; 3a designates a planar plotting mask where a liquid-crystal shutter is arranged in a planar manner; 3b designates a planar plotting mask where a digital micromirror shutter is arranged in a planar manner; 4 designates a projection lens; 5 designates a building surface; 6 designates an exposure image; 7 designates optical transmission means; 8 designates a rod lens; 9 designates an imaging lens; and 10 designates a reflection mirror.

BEST MODE FOR IMPLEMENTING THE INVENTION

The present invention will be described in detail hereunder.

Under the present invention, a stereolithographic three-dimensional object is manufactured by means of sequentially repeating, until a predetermined stereolithographic three-dimensional object is formed, operations of: exposing a surface of a photocurable resin composition by way of a planar plotting mask under control to thus form an optically-cured resin layer having a predetermined cross-sectional profile pattern; applying over the optically-cured resin layer a photocurable resin composition for another layer; and exposing the surface of the photocurable resin composition to light by way of the planar plotting mask under control, to thus further form an optically-cured resin layer having a predetermined cross-sectional profile pattern.

The building operation of the present invention can be carried out by adoption of a mold bath method for performing the processing steps of: putting a mold table into a mold bath filled with a liquid photocurable resin composition; forming a liquid photocurable resin composition layer of one layer on the mold table by means of lowering the mold table; exposing the photocurable resin composition layer by way of the planar plotting mask under control, to thus form an optically-cured resin layer (hereinafter often called a "optically-cured layer") having a predetermined pattern and thickness and forming a liquid photocurable resin composition layer for one layer on the surface of the optically-cured layer by means of further lowering the mold table; and repeating operation of further lowering the mold table, forming the liquid photocurable resin composition layer of one layer on the surface of the optically-cured layer, and exposing the liquid photocurable resin composition layer to light under control by way of the planar potting mask, to thus integrally form in a stacked manner the optically-cured layer having a predetermined pattern and thickness.

The previously-described building operations of the present invention can be performed by adoption of a method for performing the processing steps of: placing a mold table in a gas atmosphere; applying a liquid, paste-like, powdery, or a thin-film-shaped photocurable resin composition for one layer over the surface of the mold table and exposing the photocurable resin composition to light under control by way of a planar plotting mask to thus form an optically-cured layer having a predetermined pattern and thickness; and repeating operation of applying a liquid, paste-like, powdery, or thin-film-shaped photocurable resin composition for one layer over the surface of the optically-cured layer and exposing the photocurable resin composition to light under control by way of a planar plotting mask to thus form an optically-cured layer having a predetermined pattern and thickness. In the case of this method, there may be adopted a method for holding the mold table or the optically-cured layer in an upright orientation; applying the photocurable resin composition over the upper surface of the mold table or the optically-cured layer; and exposing the photocurable resin composition to light by way of a planar plotting mask, to thus sequentially form an optically-cured layer in a stacked manner. Alternatively, there may be adopted a method of placing the mold table or the optically-cured layer in a vertical or oblique orientation; applying a photocurable resin layer over the surface of the mold table or the optically-cured layer; and exposing the photocurable resin layer to light by way of the planar plotting mask, to thus sequentially form an optically-cured layer in a stacked manner. Alternatively, there may also be adopted a method of placing the mold table or the optically-cured layer in an inverted orientation; applying a photocurable resin layer composition over the surface of the mold table or the surface of the optically-cured layer; and exposing the photocurable resin layer to light by way of the planar plotting mask, to thus sequentially form an optically-cured layer in a stacked manner in a downward direction. At the time of application of a photocurable resin composition over the surface of the mold table or the surface of the optically-cured layer, an appropriate method; e.g., blade coating, cast coating, roller coating, transfer coating, brush coating, spray coating, or the like, can be adopted.

According to the present invention, a planar plotting mask capable of continuously changing a mask image is used as a planar plotting mask at the time of performance of the above-described building operation. During at least a portion of building processes; namely, all or a portion of processes for forming an optically-cured predetermined cross-sectional profile pattern, the planar plotting mask is continuously moved with respect to the surface of the photocurable resin composition. The surface of the photocurable resin composition is exposed to light by way of the planar plotting mask while the mask image of the planar plotting mask is continuously changed (i.e., dynamically changed) in synchronism with movement of the planar plotting mask in accordance with the cross-sectional profile pattern of the optically-cured resin layer to be formed, to thus form an optically-cured resin layer having a predetermined cross-sectional profile pattern. Moving the planar plotting mask in parallel with the building surface is desirable. However, movement is not always limited to a parallel direction, but the planar plotting mask may be moved in a non-parallel manner with respect to the building surface, as required.

For instance, in the case of manufacture of a stereolithographic three-dimensional object having such a shape and structure that a predetermined cross-sectional profile pattern to be formed becomes a continuous plotted area which is larger than the dimension (area) of the planar plotting mask in all optically-cured layers when a stereolithographic three-dimensional object is manufactured by repeating the above-described building operations over a plurality of stages (layers), a target stereolithographic three-dimensional object can be manufactured by means of repeating, over the plurality of layers, the following operations. Namely, there are performed, over a plurality of layers, operations of continuously moving the planar plotting mask with respect to the surface of the photocurable resin composition (a building surface) and exposing the surface of the photocurable resin composition to light by way of the planar plotting mask while continuously (dynamically) changing the mask image of the planar plotting mask in accordance with the cross-sectional profile pattern to be formed and in synchronism with movement of the planar plotting mask, to thus form an optically-cured resin layer having a predetermined cross-sectional profile pattern.

Depending on the shape and structure of the stereolithographic three-dimensional object, during the course of building operation there may arise a necessity of forming a predetermined cross-sectional profile pattern which is larger than the area of the planar plotting mask and a necessity of forming a cross-sectional profile pattern which is smaller than the planar plotting mask [e.g., in the case of a stereolithographic three-dimensional object having a sharp horn at the apex of a spherical main body, a transverse area (a cross-sectional profile pattern) of the spherical main body is larger than the area of the planar plotting mask but the transverse area of a section corresponding to the horn (the cross-sectional profile pattern) is smaller than the area of the planar plotting mask; however, the present invention is not limited to this case]. In such a case, the main body having a large cross-sectional profile pattern is formed by means of repeating the above-described building operation of continuously, dynamically changing the mask image of the planar plotting mask over a plurality of layers. In contrast, in relation to the horn section having a small cross-sectional profile pattern, the mask image of the planar plotting mask is not dynamically moved and is left stationary, and operation for exposing the building surface to light by way of the mask image is repeated over a plurality of layers until formation of the horn is completed. Thus, a target three-dimensional molded structure can be manufactured.

The present invention encompasses all the above methods. Therefore, in the present invention, the mask image of the planar plotting mask is not necessarily dynamically, continuously changed from the beginning to the end of the building processes. In a part of the building processes, the mask image may be continuously, dynamically moved. However, in another building process, the mask image may be held stationary in accordance with the cross-sectional profile pattern to be formed.

In the present invention where building is performed by means of continuously changing the mask image of the planar plotting mask in accordance with a predetermined cross-sectional pattern to be formed, the entirety of the predetermined cross-sectional profile pattern cannot be covered by the process of single continuous movement of the planar plotting mask and the exposure process. Therefore, there may be often adopted a method of performing the second continuous movement of the planar plotting mask and exposure at a position adjacent to the location where the first continuous movement of the planar plotting mask and exposure have been performed; and, in some cases, continuously performing such continuous movement and exposure three times or more, to thus form a predetermined cross-sectional profile pattern for one layer.

In such a case, in the finally-obtained stereolithographic three-dimensional object, boundary areas arise between adjacent plotted areas (an adjacent area between the first plotted area and the second plotted area, an adjacent area between the second plotted area and the third plotted area, and the like).

In that case, from the viewpoint of improvement in the strength of the obtained three-dimensional structure, edges of the boundary areas [an adjacent area (a boundary area) between the first plotted area and the second plotted area, an adjacent area (a boundary area) between the second plotted area and the third plotted area, and the like] are preferably exposed in an overlapping manner. Thereby, an area (hereinafter called an "overlapped area") that has been cured in an overlapping manner arises in the boundary area. If such operation is repeated over a plurality of layers until a target stereolithographic three-dimensional object is obtained, a line, a streak, a ridge, or the like appears in the area corresponding to the boundary areas among the adjacent plotted areas in the finally-obtained stereolithographic three-dimensional object, so that the appearance of the stereolithographic three-dimensional object is likely to be unsatisfactory. In some cases, a drop in dimensional accuracy or unevenness in strength is likely to arise.

Although no particular limitations are imposed on the present invention, the above-described points are described by reference to the drawings.

For instance, as shown in FIG. 1, the mask image of the planar plotting mask 3 is dynamically, continuously changed to thus form an optically-cured cross-sectional profile pattern encompassed by A, B, C, and D through optical building. The cross-sectional profile pattern cannot be formed by single continuous movement and exposure. Hence, an area corresponding to a plotted area (1) is optically cured by means of first continuous movement and exposure; an area corresponding to a plotted area (2) is optically cured by means of second continuous movement and exposure; and an area corresponding to a plotted area (3) is optically cured by means of third continuous movement and exposure. Thus, the optically-cured cross-sectional profile pattern encompassed by A, B, C, and D is formed. In that case, an overlap area a1 (a boundary area) between the plotted area (1) and the plotted area (2), which are adjacent to each other, and an overlap area a2 (a boundary area) between the plotted area (2) and the plotted area (3), which are adjacent to each other, are often exposed in an overlapping manner, from the viewpoint of maintenance of the strength of the obtained stereolithographic three-dimensional object. Consequently, the degree (the degree of curing) to which the overlap area a1 (the boundary area) and the overlap area a2 (the boundary area) are exposed becomes higher than the degree to which the other area (the area other than the overlap areas a1 and a2) is exposed. As a result, the cured state achieved in the overlap areas a1 and a2 become different from that achieved in the other area (i.e., the degree of curing becomes higher). In the finally-obtained stereolithographic three-dimensional object, a line, a streak, or a ridge appears in the areas corresponding to the overlap areas a1 and a2, which in turn causes unsatisfactory appearance of the stereolithographic three-dimensional object. On some occasions, a drop in dimensional accuracy and unevenness in strength are likely to arise.

Moreover, in the present invention, the number of planar plotting masks used for optical building is not limited to one. Optical building may be performed by use of a plurality of (two or more) planar plotting masks. When optical building of the present invention is performed by use of a plurality of planar plotting masks, a building rate is increased greatly, by means of optically curing the plotted area (1), the plotted area (2), and the plotted area (3) in FIG. 1 through use of the plurality of the planar plotting masks.

However, even in such a case, when the boundary areas between the plotted areas are optically cured in an overlapped manner in order to enhance the strength of the obtained stereolithographic three-dimensional object, the overlap area a1 and the overlap area a2 arise. The intensity of exposure (the degree of curing) of the overlap area a1 (the boundary area) and that of the overlap area a2 (the boundary area) are higher than the intensity of exposure achieved in the other area (the area other than the overlap areas a1 and a2). As a result, a line, a streak, or a ridge appears in the locations of a finally-obtained stereolithographic three-dimensional object corresponding to the overlap areas a1 and a2, so that unsatisfactory appearance of the stereolithographic three-dimensional object, a drop in dimensional accuracy, and unevenness in strength are likely to arise.

Figure 2:
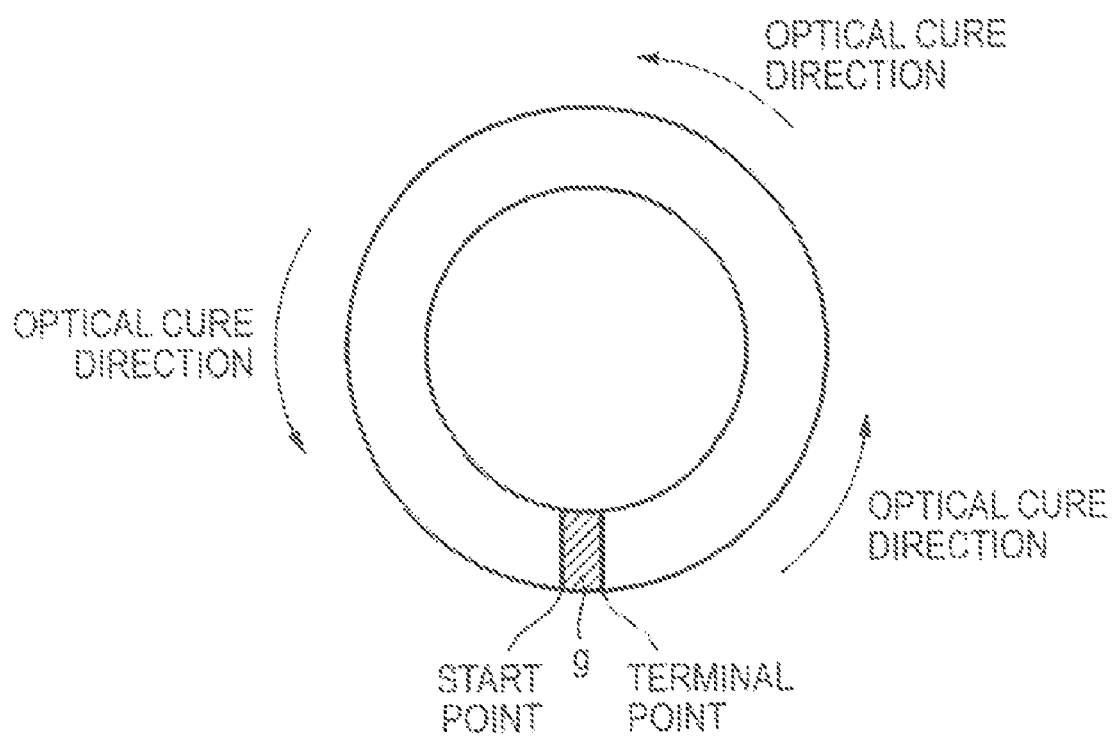
FIG. 2 is a view showing another example when there is formed a cross-sectional profile pattern having a boundary area (an overlapping area) between plotted areas.

When a predetermined cross-sectional profile pattern is formed through use of one planar plotting mask by means of dynamically changing the mask image of the planar plotting mask while the planar plotting mask is being continuously moved as in the case of drawing a picture with a single stroke of a pen to thus, optical building is performed such that the start point coincides with the end point as shown in, e.g., FIG. 2. When a boundary between the start point and the end point has been exposed in an overlapping manner in order to enhance the strength of the boundary area between the start point and the end point, an overlap "c" arises between the start point and the end point. The intensity of exposure (the degree of curing) of the overlap "c" becomes higher than that achieved in the other area. As a result, a line, a streak, or a ridge appears at the location of the finally-obtained stereolithographic three-dimensional object corresponding to the overlap "c," so that unsatisfactory appearance of the stereolithographic three-dimensional object, a drop in dimensional accuracy, and unevenness in strength are likely to arise.

Even when optical building has been performed in such a way that the boundary areas of the plotted areas do not overlap each other (are not exposed in an overlapped manner) and such that end portions of the plotted areas merely adjoin each other, a line, a streak, or the like, appears at the locations of a finally-obtained stereolithographic three-dimensional object corresponding to the boundary area where the end portions of the plotted areas adjoin each other, though the degree of the line or streak is smaller than that acquired when the boundary portions are overlapped (when the boundary areas are exposed in an overlapping manner), so that unsatisfactory appearance is likely to arise.

In the present invention, in order to prevent the boundary area between the adjoining plotted areas from appearing in the optically-cured resin layer of a stereolithographic three-dimensional object in the form of a line, a streak, a ridge, or the like, optical building is performed such that the boundary area between the adjoining plotted areas in the optically-cured resin layer does not become noticeable in the finally-obtained stereolithographic three-dimensional object.

In view of this point, the term "boundary area between the adjoining plotted areas in the optically-cured resin layer" used herein signifies a boundary area (e.g., a case shown in FIG. 2) of the optically-cured resin layer formed when the optically-cured predetermined cross-sectional profile pattern is formed by means of continuous movement of the planar potting mask and exposure, as in the case of drawing a picture with a single stroke of a pen, and a boundary area in the optically-cured resin layer formed by building operation other than the above-described building operations, as well as a boundary area of the optically-cured resin layer (e.g., a case shown in FIG. 1) formed when the optically-cured predetermined cross-sectional profile pattern is formed by means of performing continuous movement of the planar plotting mask and exposure over a plurality of columns. Moreover, the term "boundary area" used herein signifies a boundary area where ends of plotted areas are optically cured in an overlapped manner (i.e., an "overlap" where optical cure has been performed in an overlapping manner), and a boundary area which has not been subjected to overlapped optical curing and where ends of the optically-cured plotted areas solely adjoin to each other.

In the present invention, an arbitrary method may be employed, so long as the method makes it possible to make the boundary area between the adjoining plotted areas in the optically-cured resin layer unnoticeable in the finally-obtained stereolithographic three-dimensional object.

Of the methods, the present invention preferably adopts at least one of the following method and means, as a method and means for making a boundary area between adjoining plotted areas in an optically-cured resin layer unnoticeable:

(i) a method and means for making a total intensity of light radiated onto boundary areas among adjacent plotted areas in an optically-cured resin layer equal or analogous to the intensity of light radiated onto areas other than the boundary areas;

(ii) a method and means for making the shape of the boundaries between the adjacent plotted areas in the optically-cured resin layer curve; and (iii) a method and means for staggering positions of the boundary areas among the adjacent plotted areas in the optically-cured resin layer in vertically-stacked optically-cured resin layers.

The methods and means of (i) to (iii) may be adopted solely, or two or more of them may be adopted in combination. Particularly, when two or three of (i) to (iii) are adopted in combination, the boundary area between the adjoining plotted areas in the optically-cured resin layer can be more effectively prevented from becoming noticeable.

The method (i) is effective particularly for a case where a stereolithographic three-dimensional object is manufactured by means of exposing the boundary area between the adjoining plotted areas in an overlapped manner (i.e., the case where an "overlap" arises in the boundary area). The method can be practiced by means of programming a computer such that the planar plotting mask exhibits a mask image, where transmission or reflection of light to or from a building surface achieved in the area corresponding to the overlap becomes lower than that achieved in the other area, when optical building is carried out by means of continuously changing the mask image of the planar plotting mask.

In FIG. 1, for instance, the intensity of light radiated onto the overlap a1 (the boundary area) in the plotted area (1) which is to be subjected to first continuous movement of the planar plotting mask and exposure is made lower than the intensity of light radiated onto the other area in the plotted area (1), whereby optical curing is performed while the degree of curing of the overlap a1 is made lower than the degree of curing of the other area. Next, the intensity of light radiated onto areas, corresponding to the overlaps a1 and a2, in the plotted area 2 which is to be subjected to second continuous movement of the planar plotting mask and exposure is made lower than the intensity of light radiated onto the other area in the plotted area (2), thereby performing optical curing. At a point in time when optical curing of the plotted area (2) has been completed, the degree of curing of the overlap a1 is made equal to the degree of curing of the other areas in the plotted areas (1) and (2) (i.e., the areas other than the overlaps a1 and a2). Optical curing of the plotted area (3) is also performed in the same manner as mentioned previously. At a point in time when optical curing of the plotted area (3) has been completed, the degree of curing of the overlap a2 is made equal to the degree of curing of the other areas in the plotted areas (1), (2), and (3) (i.e., the areas other than the overlaps a1 and a2). Thus, the degree of curing achieved in the entire optically-cured cross-sectional profile pattern encompassed by ABCD can be made uniform. The building operation is repeated over a plurality of layers until a desired stereolithographic three-dimensional object is obtained. Accordingly, no line, streak, ridge, or the like arises in the areas corresponding to the overlaps between the plotted areas, and there can be obtained a stereolithographic three-dimensional object that has superior appearance, has superior dimensional accuracy, and is free from unevenness in strength and hardness.

The method (ii) can be practiced by means of programming a computer such that the planar plotting mask exhibits a mask image, where areas corresponding to boundary areas become curved, when optical building is performed by means of continuously changing the mask image of the planar plotted mask.

Figure 3A:
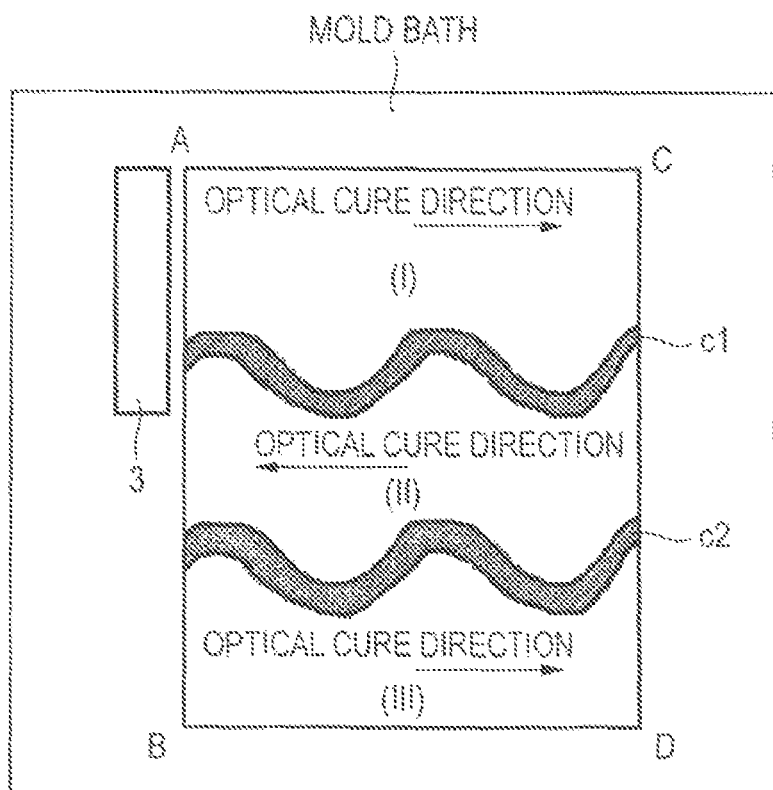
FIGS. 3A and 3B are views showing yet another example when there is formed a cross-sectional profile pattern having a boundary area (an overlapping area) between plotted areas.

As shown in, e.g., FIG. 3A, even when optical building has been performed such that an overlap c1 (a boundary area) between the plotted area (1) and the plotted area (2) and an overlap c2 (a boundary area) between the plotted area (2) and the plotted area (3) become curved, occurrence of a line, a streak, a ridge, or the like in the areas, corresponding to the overlaps c1 and c2, in a finally-obtained stereolithographic three-dimensional object is prevented as compared with the case where the overlaps c1 and c2 are straight. A stereolithographic three-dimensional object having superior appearance and dimensional accuracy and reduced unevenness in strength and hardness can be obtained. In connection with the method shown in FIG. 3A, even when the intensity of light radiated onto the areas, which are to become the overlaps c1 and c2, is not made smaller than the intensity of light radiated onto the other area at the time of optical curing of the plotted area (1), the plotted area (2), and the plotted area (3), occurrence of a line, a streak, a ridge, or the like in the areas corresponding to the overlaps c1 and c2 is prevented as compared with a case where the overlaps c1 and c2 are made straight. Occurrence of a line, a streak, a ridge, or the like, in the areas corresponding to the overlaps c1 and c2 can be prevented more effectively by combination of the method (ii) and the method (i).

Figure 3B:
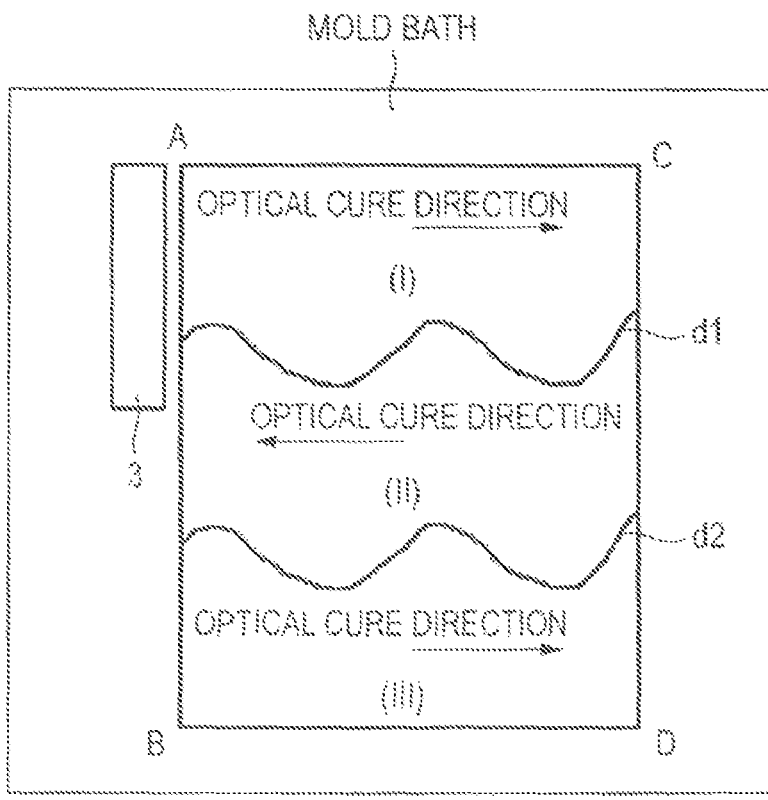

The method (ii) is applied to the case where optical building is performed by merely causing the end portions of the plotted areas to adjoin each other without exposing the boundary area between the plotted areas (1) and (2) and the boundary area between the plotted area (2) and (3) to light in an overlapped manner. As shown in FIG. 3B, even when adjoining end portions (the boundary areas) d1 and d2 are made curved, the chance of a line or a streak appearing in the area corresponding to the boundary area (the adjoining area) is diminished, so that a stereolithographic three-dimensional object having superior appearance can be obtained.

The method (iii) can be practiced by means of programming a computer such that the positions of the boundary areas among adjoining plotted areas in the optically-cured resin layer become staggered in the vertical direction among the optically-cured resin layers that are vertically stacked to constitute the stereolithographic three-dimensional object.

Figure 4A:
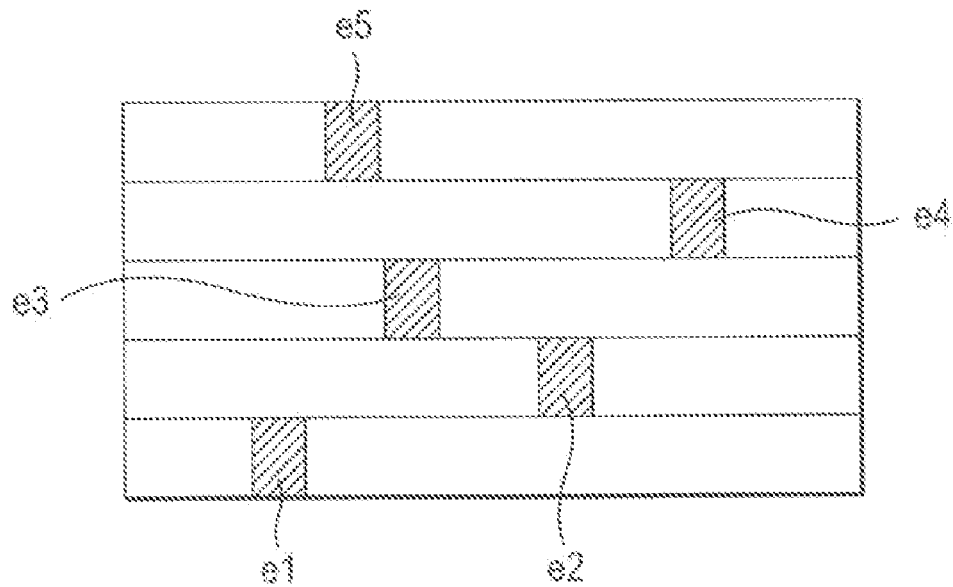
FIGS. 4A and 4B are views showing an example of a stereolithographic method of the present invention when optical building is performed such that positions of boundary areas (overlapping areas) among plotted areas are staggered from one layer to another layer among optically-cured vertically-arranged resin layers.
Figure 4B:
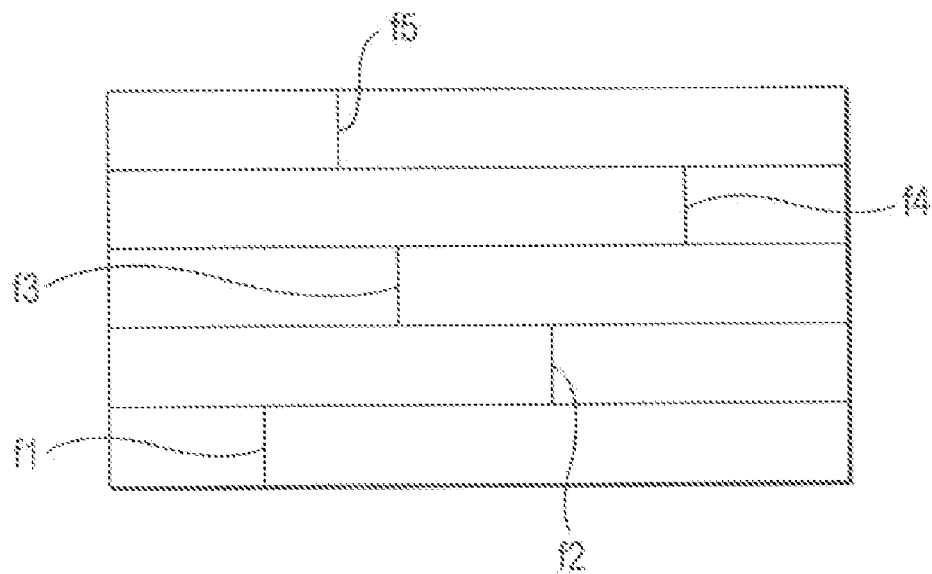

FIGS. 4A and 4B can be mentioned as showing the case of adoption of the method (iii) [both FIGS. 4A and 4B are longitudinal cross-sectional views]. FIG. 4A shows the fragmentary structure of a stereolithographic three-dimensional object that is formed by exposing the boundary areas among the adjacent plotted areas to light in an overlapped manner; namely, a schematic view showing a case where overlaps e1, e3, e3, e4, e5, . . . , which correspond to the boundary areas, are formed while being staggered among optically-cured resin layers that are vertically stacked to constitute the stereolithographic three-dimensional object. FIG. 4B shows a fragmentary structure of a stereolithographic three-dimensional object obtained by performing optical building while end portions of plotted areas are caused to merely adjoin each other, without exposing the boundary areas among the adjacent plotted areas to light in an overlapping manner; namely, a schematic view showing a case where boundary areas f1, f2, f3, f4, f5, . . . , are staggered among optically-cured resin layers that are vertically stacked to constitute a stereolithographic three-dimensional object.

As can be seen from FIGS. 4A and 4B, in the case of the method (iii), the boundary areas (the overlaps or adjoining portions of the ends) among the plotted areas are staggered among the vertical layers and are not concentrated on the same location. Hence, no line, streak, ridge, or the like arises in a finally-obtained three-dimensional molded structure, and there is obtained a three-dimensional molded structure that has superior appearance and superior dimensional accuracy and diminished unevenness in strength and hardness.

In connection with the stereolithographic method and apparatus of the present invention, a means or method for continuously moving the planar plotting mask with respect to the surface (building surface) of the photocurable resin composition is not limited to any particular means or method. For instance, a linear guide, a shaft, a flat bar, or the like is taken as a guide, and driving force is transmitted by use of a ball screw, a trapezoidal screw thread, a timing belt, a rack and pinion, a chain, or the like. An AC servo motor, a DC servo motor, a stepping motor, a pulse motor, or the like can be used as the drive source. In addition, a linear motor system doubling as a guide and a drive means or the extremity of an arm of a polyarticular robot can also be utilized. As mentioned above, an arbitrary means or method can be adopted for movement of the present system. Among the above-described motors, a pulse motor is preferably used as a drive source, in view of the ability to continuously, accurately actuate the planar plotting mask at a micropitch and to synchronize the movement of the planar plotting mask to continuous changes in the mask image with high accuracy.

It may be the case that the planar plotting mask can be moved with respect to the building surface only in one direction (only one of the direction of the X axis and the direction of the Y axis). However, the mask is preferably made movable in both the directions of the X and Y axes. So long as the planar plotting mask is made movable in both the directions of the X and Y axes, the planar plotting mask can be continuously moved along a straight path, a curved path, or another arbitrary path, to thus form optically-cured cross-sectional profile pattern of various shapes with superior building accuracy and at a high building rate. For instance, a circle is drawn by a single stroke of a pen, and a hollow optically-cured cross-sectional profile pattern can be formed at high building rate and with high building accuracy.

The direction and speed of continuous movement of the planar plotting mask, which are required at the time of optical building, are controlled and adjusted by use of a computer or the like, in accordance with the type of a light source, the intensity of light radiated onto the surface of a photocurable resin composition, an exposed area (an exposed size) on the surface of the photocurable resin composition exposed by way of the planar plotting mask, the shape of a cross-sectional profile pattern to be formed, the type of a photocurable resin composition, a light curing characteristic of the photocurable resin composition, an exposure time required to form an optically-cured layer, and the like. In general, when the planar plotting mask is linearly moved with constant velocity in parallel with the surface of the photocurable resin composition from one end of the exposure area to the other, opposing end on the surface of the photocurable resin composition, the amount of light radiated onto the surface of the photocurable resin composition can be readily controlled so as to become uniform.

When the mask image of the planar plotting mask is continuously (dynamically) changed in synchronism with continuous movement of the planar plotting mask, information pertaining to a mask image to be formed by the planar plotting mask is stored in the computer in advance in association with specifics of the cross-sectional profile pattern to be formed and a continuous movement speed of the planar plotting mask. It is better to continuously change the mask image of the planar plotting mask in accordance with the information. A liquid-crystal shutter and a digital micromirror shutter can be mentioned as specific examples of such a planar plotting mask. A liquid-crystal shutter or a digital micromirror shutter, which is preferably used as the planar plotting mask in the present invention, has already been used in other fields (e.g., TVs, personal computers, projectors, car navigation systems, portable cellular phones, and the like) as means capable of continuously (dynamically) forming an image.

The planar plotting mask is preferably a square or rectangular planar plotting mask where a plurality of microoptical shutters, which can block and permit transmission of light, in microdot areas, are arranged side by side in a planar manner (in the direction of X-Y). No particular limitations are imposed on the number of microoptical shutters to be arranged in the planar plotting mask. Microoptical shutters, which have hitherto been known, can be used. QVGA (number of pixels=320 dots·240 dots), VGA (number of pixels=640·480 dots), SVGA (number of pixels 800·600 dots), UXGA (number of pixels=1024·768 dots), QSXVGA (number of pixels=2560·2648 dots), and the like can be used as the liquid-crystal shutter (a liquid-crystal display element).

For example, a DMD (registered trademark) device of "DLP technology" (registered trademark) manufactured by Texas Instruments can be used as a digital micromirror shutter.

The planar plotting mask, which is formed from the above-described liquid-crystal shutter or the digital micromirror shutter preferably employed in the present invention, can continuously change the mask image in the manner of, e.g., motion pictures of a TV or a movie, by means of causing, during continuous movement of the planar plotting mask, the plurality of micro-optical shutters to block and/or allow transmission of light in accordance with the cross-sectional pattern to be formed. As a result, the light corresponding to the mask image (a dynamic mask image), which continuously changes while continuously moving, is continuously radiated on the surface of the photocurable resin composition while a radiated position is continuously being moved. The surface of the photocurable resin composition located in the exposed area is continuously cured, to thus form a predetermined cross-sectional profile pattern for one layer.

By use of the illustrated liquid-crystal shutters, a pixel pitch (a distance between adjacent pixels) on the surface of the photocurable resin composition is arranged to assume a value of 0.1 mm (the building accuracy required for optical building). In the case of the related-art technique of effecting radiation while the liquid-crystal shutters remain stopped, a plane of exposure measures 32 mm·24 mm for QVGA, 64 mm·48 mm for VGA, 80 mm·60 mm for SVGA, 102.4 mm·76.8 mm for UXGA, and 256 mm·264.8 mm for QSXGA. Manufacturing a large-size, stereolithographic three-dimensional object, for which one side of the plane of exposure exceeds a size of 300 mm, has been difficult. In contrast, the present invention employs a planar plotting mask, such as a conventional commercial liquid-crystal shutter. Exposure is performed while, simultaneously with continuous movement of the mask with respect to the surface of the photocurable resin composition, the mask image is continuously changed in the manner of a motion picture in synchronism with movement of the liquid-crystal shutter. Hence, no limitations are imposed on the size of the plane of exposure (the cross-sectional profile pattern), and an optically-cured cross-sectional profile pattern of an arbitrary size can be formed. Therefore, in the case of the present invention, a large-size, stereolithographic three-dimensional object whose one side exceeds a size of 300 mm can also be manufactured readily, with high building accuracy, at an increased building rate, and with superior productivity.

The light source is provided on the back of the planar plotting mask, and the light originating from the light source is radiated onto the surface of the photocurable resin composition by way of the planar plotting mask. No particular limitations are imposed on the type of the light source, and any light source can be used, so long as the light source can be used for stereolithographic. For instance, there can be used an inexpensive general-purpose lamp, such as a xenon lamp, a metalhalide lamp, a mercury-arc lamp, a fluorescent lamp, a halogen lamp, or an incandescent lamp. Therefore, a stereolithographic apparatus can be made inexpensive and easy to use.

No particular limitations are also imposed on the shape, size, and number of light sources. The shape, size and number of light sources can be appropriately selected in accordance with the shape and size of a planar plotting mask and the shape and size of the photocurable cross-sectional profile pattern to be formed. The light source may be shaped like, e.g., a dot, a sphere, a rod, or a plane. Moreover, a dot-shaped or spherical light source may be provided on the back of the planar plotting mask in the form of a straight line or a plurality of lines.

The light source may also be provided on the back of the planar plotting mask so as to be continuously movable in conjunction with the planar plotting mask. With a view toward enhancing building accuracy and a building rate, reducing the weight of the apparatus, and enhancing ease of maintenance, the light source may be stationarily provided in a fixed position, and the light originating from the light source may be guided to the back of the planar plotting mask by way of a light guide or another optical transmission means. Further, the transmission means, such as an optical fiber, a light guide, or the like, may be provided so as to be continuously movable in conjunction with the planar plotting mask.

A method for collecting light by use of a plurality of light sources for increasing a building rate, to thus attain high light energy, may also be adopted. Particularly, when an optical fiber or a light guide is used, there may be a merit of facilitating collection of light from the plurality of light sources.

With a view toward enhancing building accuracy and a building rate, reducing the weight of the apparatus, enhancing ease of maintenance, and cutting the cost of the apparatus, means (e.g., a light-condensing lens, a Fresnel lens, and the like) for properly guiding the light from the light source to the planar plotting mask and means (e.g., a projection lens, a projector lens, and the like) for exposing the mask image formed by the planar plotting mask (i.e., an image formed by the light having passed through the planar plotting mask) to light in a predetermined position on the surface of the photocurable resin composition with high accuracy are preferably arranged in accordance with the type, shape, and number of the light sources disposed on the back of the planar plotting mask and the shape and size of the planar plotting mask. The means are preferably arranged to be continuously moved in synchronism with continuous movement of the planar plotting mask.

No particular limitations are imposed on the type of photocurable resin composition used in the present invention. Any one of a liquid photocurable resin composition, a powdery photocurable resin composition, and a thin-film-shaped photocurable resin composition can be used.

In the present invention, there can be used a photocurable resin composition that contains a photoinitiator, a sensitizer, if necessary, and one type or two or more types of compositions which have hitherto been used for optical building; for instance, various oligomers such as urethane acrylate oligomer, epoxy acrylate oligomer, ester acrylate oligomer, and polyfunctional epoxy resin; acrylic compounds such as isobornyl acrylate, isobornyl methacrylate, dicyclopentenyl acrylate, dicyclopentenyl methacrylate, dicyclopentenyroxi ethyl acrylate, cyclopentenyroxi ethyl methacrylate, dicyclopentanyl acrylate, dicyclopentanyl methacrylate, bornyl acrylate, bornyl methacrylate, 2-hydroxy ethyl acrylate, cyclohexyl acrylate, 2-hydroxy propyl acrylate, phenoxy ethyl acrylate, morpholine acrylamide, morpholine methacrylamide, acrylamide, and the like; various monofunctional vinyl compounds such as N-vinyl pyrolidone, N-vinyl caprolactam, vinyl acetate, styrene, and the like; multifunctional vinyl compounds such as trimethylolpropane triacrylate, ethylene-oxide-denatured trimethylolpropane triacrylate, ethylene glycol diacrylate, tetraethylene glycol diacrylate, polyethylene glycol diacrylate, 1,4-butanediol diacrylate, 1,6-hexanediol diacrylate, neopentyl glycol diacrylate, dicyclopentanyl diacrylate, polyester diacrylate, ethylene-oxide-denatured bisphenol A diacrylate, pentaerythritol triacrylate, pentaerythritol tetraacrylate, propylene-oxide-denatured trimethylolpropane triacrylate, propylene-oxide-denatured bisphenol A diacrylate, tris-(acryloxyethyl) isocyanurate; and various epoxy-based compounds such as hydrogenated bisphenol A diglycidyl ether, 3,4-epoxycyclo hexylmethyl-3,4-epoxycyclo hexane carboxylate, 2-(3,4-epoxycyclo hexyl-5,5-spiro-3,4-epoxy)cyclohexane-meta-dioxane, bis(3,4-epoxycyclo hexylmethyl)adipate and the like.

If necessary, the photocurable resin composition used in the present invention may contain a filler, such as solid fine particles or whiskers. When a photocurable resin composition containing a filler is used, an attempt can be made to enhance dimensional accuracy, which is achieved by a reduction in the contraction of the volume during curing operation, mechanical properties, and heat resistance.

Solid fine particles used as the filler include, e.g., inorganic fine particles such as carbon black fine particles, and organic polymer fine particles such as polystyrene fine particles, polyethylene fine particles, polypropylene fine particles, acrylic resin fine particles, synthetic rubber fine particles, and the like. One type or two or more types of these fine particles can be used. No particular limitations are imposed on the particle size of the solid fine particles. In general, fine particles having an average particle size of 200 mm or less, particularly, an average particle size of 100 mm or less, are preferably used.

Preferably used whiskers include whiskers having a diameter of 0.3 to 1 mm, particularly a size of 0.3 to 0.7 mm; a length of 10 to 70 mm, particularly a length of 20 to 50 mm; and an aspect ratio of 10 to 100 mm, particularly an aspect ratio of 20 to 70 mm. The dimension and aspect ratio of the whiskers, which are referred to herein, are those measured by use of a laser diffraction/scattering-type particle size distribution measurement apparatus. No particular limitations are imposed on the types of whiskers. For instance, there can be mentioned ammonium-pentaborate-based whiskers, aluminum-oxide-based whiskers, aluminum-nitride-based whisker water, oxidized-magnesium-sulfate-based whiskers, titanium-oxide-based whiskers, and the like. One type or two or more types of whiskers can be used.

When the photocurable resin composition containing solid fine particles and/or whiskers is used, the solid fine particles are preferably contained at a ratio of 5 to 70 vol. % to the total volume of the photocurable resin composition. Further, the content of whiskers is preferably set to 5 to 30 vol. %. When both the solid fine particles and whiskers are contained, the total contents of the fine particles and the whiskers are preferably 10 to 75 vol. % with respect to the total volume of the optically-cured layers.

The solid fine particles and/or whiskers may be subjected surface treatment by use of a silane coupling agent or may not be subjected to surface treatment. However, the solid fine particles have preferably undergone surface treatment. When the solid fine particles and/or the whiskers have been subjected to surface treatment by a silane coupling agent, an optically-cured article having a higher thermal deformation temperature, a higher flexural modulus, and higher mechanical strength can be obtained. In that case, any one of the silane coupling agents, which have hitherto been used for surface treatment. Amino silane, epoxy silane, vinyl silane, and (meta) acryl silane can be mentioned as a preferable silane coupling agent.

Embodiments

The present invention will be described specifically hereinbelow by reference to the drawings. However, the present invention is not limited to the illustrated embodiments.

FIGS. 5 to 8 show specific examples of the principal sections of a stereolithographic apparatus (an optical building apparatus) used in the stereolithographic method (the optical building method) of the present invention. FIG. 9 shows processes (operation procedures) required when optical building is performed according to the method of the present invention by use of the optical building apparatus such as that shown in FIGS. 5 to 8.

In FIGS. 5 to 9, reference numeral 1 designates a light source; 2 designates a light-condensing lens; and 3 designates a planar plotting mask. Of the planar plotting mask, reference numeral 3a designates a planar plotting mask (hereinafter sometimes called a "liquid-crystal planar plotting mask") where a liquid-crystal shutter is arranged in a planar manner; and 3b designates a planar plotting mask (hereinafter sometimes called a "DMD planar plotting mask") where a digital micromirror shutter is arranged in a planar manner. Further, reference numeral 4 designates a projection lens; 5 designates a building surface (a building surface of one layer) formed from the surface of a photocurable resin composition; 5a designates one end of the building surface; 5b designates the other end of the building surface; 6 designates an exposure image (an optically-cured resin layer) formed on the building surface; 7 designates optical transmission means such as an optical fiber or a light guide; 8 designates a rod lens; 9 designates an imaging lens; and 10 designates a reflection mirror.

As shown in FIGS. 5 to 9, the light originating from the light source 1 is radiated so as to cover the entire surface of the planar plotting mask 3 (3a, 3b and the like) by use of the light-condensing lens 2.

Figure 5:
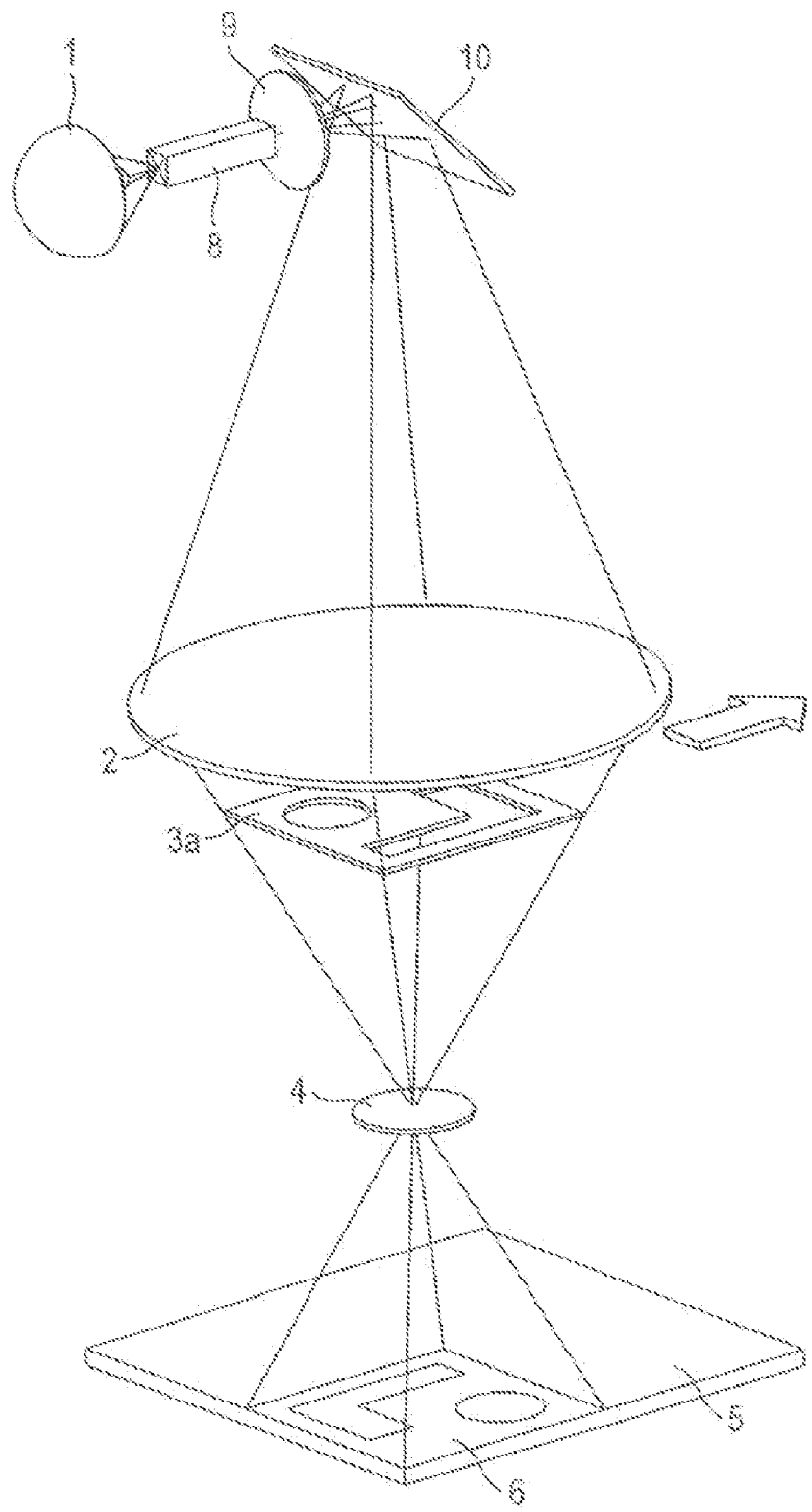
FIG. 5 is a view showing an example stereolithographic apparatus employed in the present invention.
Figure 6:
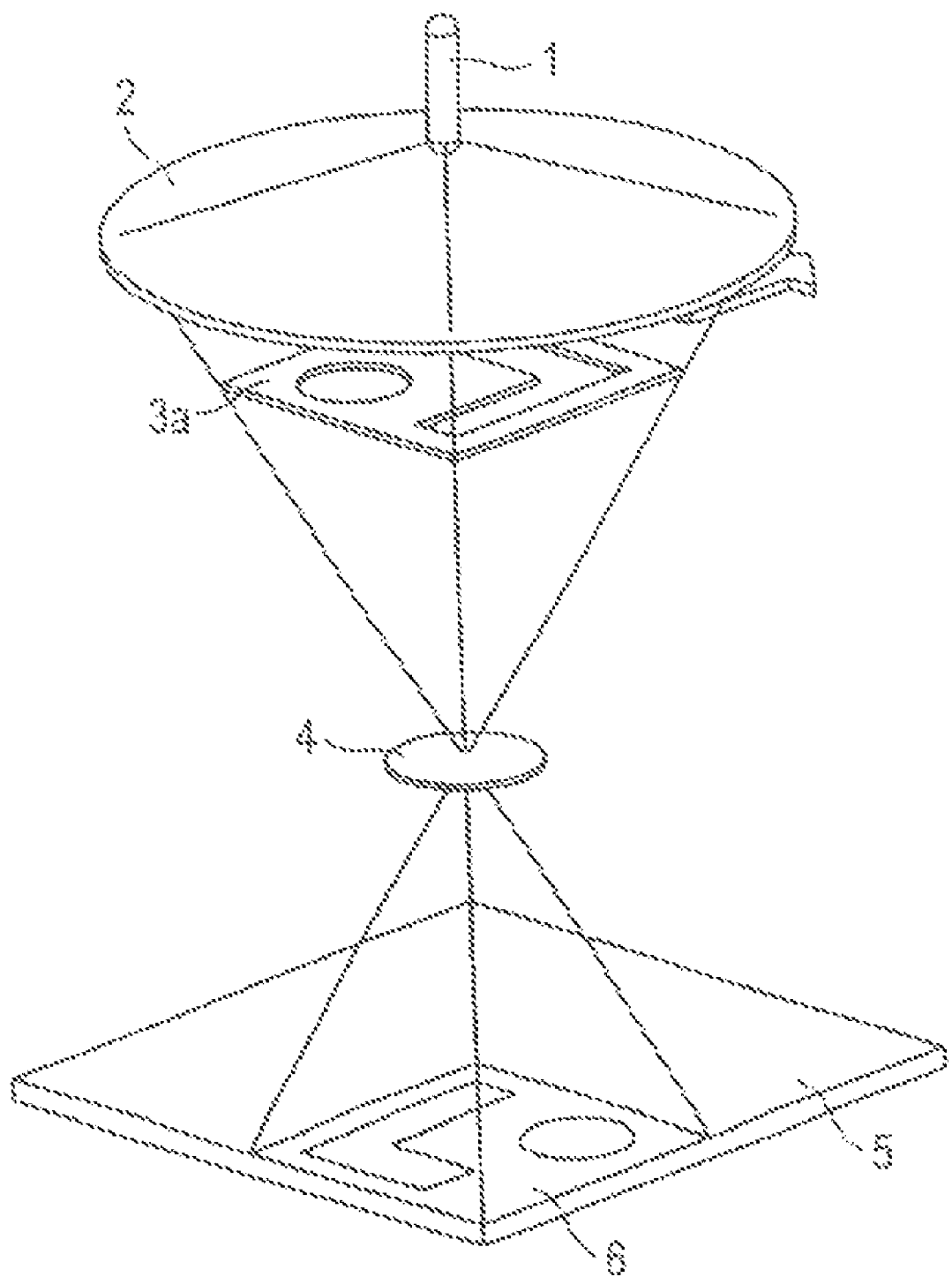
FIG. 6 is a view showing another example stereolithographic apparatus employed in the present invention.
Figure 7:
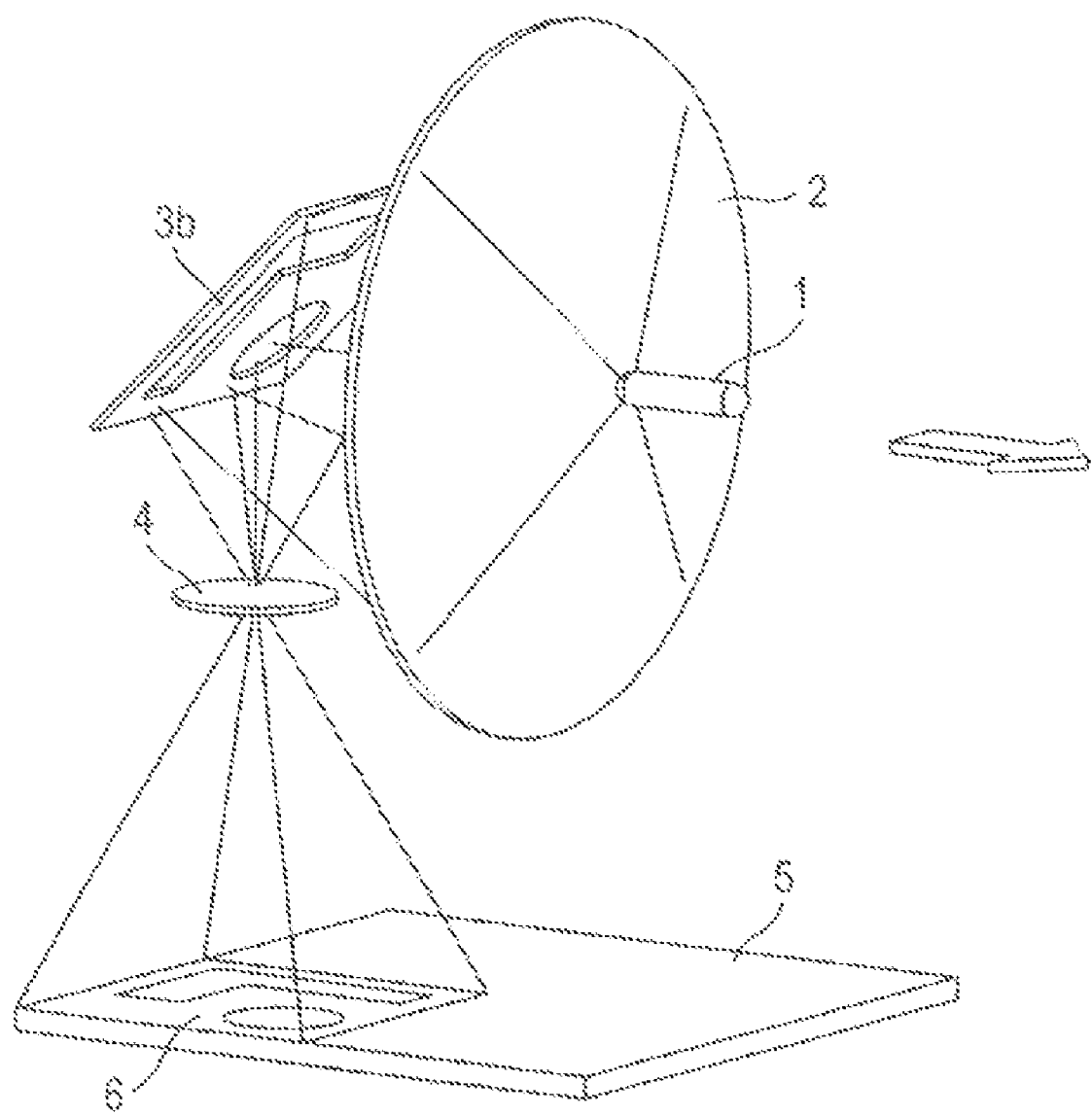
FIG. 7 is a view showing yet another example stereolithographic apparatus employed in the present invention.

At that time, as shown in FIG. 5, the light originating from the light source 1 may be caused to pass through the rod lens 8 and the imaging lens 9 and is then reflected by the reflection mirror 10, to thus guide the light to the light-condensing lens 2. As shown in FIGS. 6 and 7, the light source 1 may be disposed directly on the back of the light-condensing lens 1, to thus guide the light originating from the light source 1 directly to the light-condensing lens 2. Alternatively, as shown in FIG. 8, the light source 1 may be placed at a position away from the light-condensing lens 2, and the light originating from the light source 1 may be guided to the light-condensing lens 2 by way of the light transmission means 7, such as an optical fiber or a light guide.

In the case of the system such as that shown in FIGS. 5 to 7, where the light source 1 is disposed on the back of the light-condensing lens 2, the light source 1 is continuously moved in a scanning direction along with the light-condensing lens 2, the planar plotting mask 3 (3a, 3b, and the like), the projection lens 4, the rod lens 8, the imaging lens 9, and the reflection mirror 10 during optical building.

Figure 8:
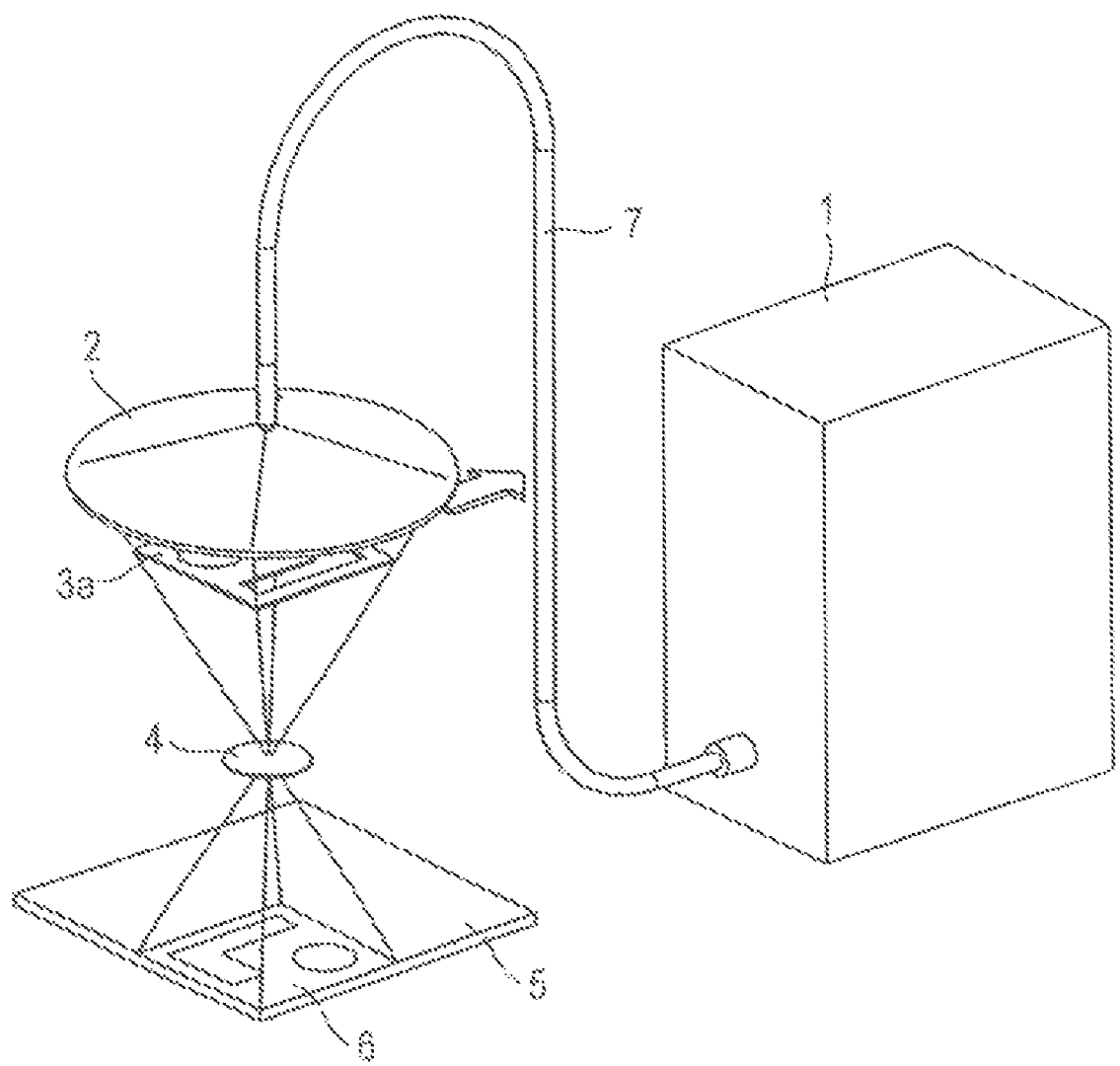
FIG. 8 is a view showing still another example stereolithographic apparatus employed in the present invention.
Figure 9:
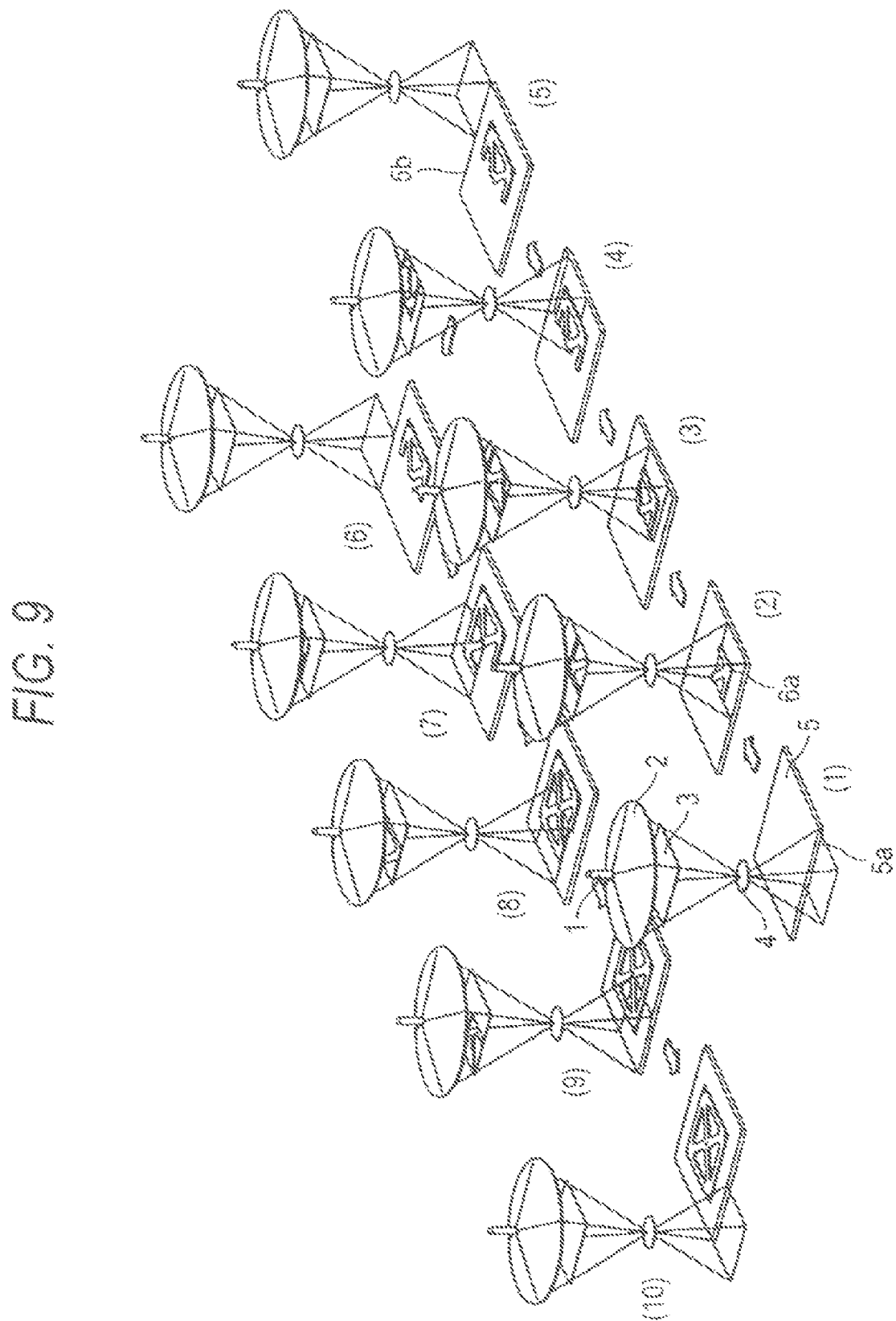
FIG. 9 is a view showing an example stereolithographic method of the present invention.

As shown in FIG. 8, when the light originating from the light source 1 is guided to the back of the light-condensing lens 2 by way of the light transmission means 7 such as an optical fiber or a light guide, the light source 1 is fixedly placed in a predetermined position, and the flexible light transmission means 7, such as an optical fiber or a light guide, can be continuously moved in the scanning direction along with the light-condensing lens 2, the planar plotting mask 3 (3a, 3b, and the like), and the projection lens 4 during optical building.

No particular limitations are imposed on the type and shape of the light source 1. For instance, as shown in FIGS. 5 to 9, the light source may have a round light emission section. Alternatively, the light source may assume an unillustrated another shape. As shown in FIGS. 5 to 7, the light source 1 is preferably oriented horizontally.

During optical building operation, a predetermined mask image, which continuously changes in synchronism with movement of the planar plotting mask in association with the cross-sectional profile pattern of the optically-cured resin layer to be formed, is dynamically formed on the planar plotting mask 3 (3a, 3b, and the like). Therefore, the light having been radiated over the entire surface of the planar plotting mask 3 (3a, 3b, and the like) by way of the light-condensing lens 2 is allowed to pass or blocked (or reflected in the case of the DMD planar plotting mask) by way of the predetermined mask image that is formed while being continuously changed every moment by the planar plotting mask 3 (3a, 3b, and the like). Only the light having passed through an unmasked (unshielded) area is radiated on the building surface 5 formed from the photocurable resin composition by way of the projection lens 4, whereupon an exposure image (an optically-cured section) 6 of a predetermined shape pattern is formed on the building surface 5.

No particular limitations are imposed to the shape of the planar plotting mask 3 (3a, 3b, and the like). A plotting mask of an appropriate shape can be adopted in accordance with the shape and size (particularly the cross-sectional profile and size) of an stereolithographic three-dimensional object to be manufactured. The planar plotting mask 3 (3a, 3b, and the like) may assume, e.g., a square or essentially-square shape such as that shown in FIGS. 5 to 9, or another shape.

Moreover, an appropriate size can also be adopted as the dimension of the planar plotting mask 3 (3a, 3b, and the like) in accordance with the shape and dimension (particularly the cross-sectional profile and size) of an stereolithographic three-dimensional object to be manufactured. For instance, as shown in FIGS. 5 to 9, the planar plotting mask 3 (3a, 3b, and the like), whose width is smaller than the total width of the predetermined optically-cured cross-sectional profile pattern (the entire width of the building surface) to be formed, is used to thus enable manufacture of a predetermined optically-cured cross-sectional profile pattern which is larger than the planar plotting mask 3.

When the liquid-crystal planar plotting mask 3a is used as the planar plotting mask 3, the apparatus is designed to continuously (dynamically) repeat the following operations in accordance with the predetermined cross-sectional profile to be formed and the information previously stored in a computer in association with continuous movement of the liquid-crystal planar plotting mask 3a until an optically-cured resin layer having a predetermined cross-sectional profile is formed; namely, operation of opening, among the plurality of micro-crystal shutters placed in the liquid-crystal planar plotting mask 3a, liquid-crystal shutters, located in positions through which light is to pass, so as to allow transmission of light, and closing the liquid-crystal shutters, located in positions through which light is not to pass, to thus block transmission of light.

When the DMD planar plotting mask 3b is used as the planar plotting mask 3, the apparatus is designed to continuously (dynamically) repeat the following operations in accordance with the predetermined cross-sectional profile to be formed and the information previously stored in a computer in association with continuous movement of the DMD planar plotting mask 3b until an optically-cured resin layer having a predetermined cross-sectional profile is formed; namely, operation of orienting, among the plurality of mirror shutters placed in a planar manner, specific mirror shutters, located in positions through which light is to pass, in a direction where light is reflected (guided) toward the projection lens 4 and a translucent plane 5, and orienting the mirror shutters, located in positions through which light is not to pass, in a direction where light is not reflected (not guided) toward the projection lens 4 and a translucent plane 5.

When optical building is performed by use of the liquid-crystal planar plotting mask 3a or the DMD planar plotting mask 3b, a computer is programmed such that the planar plotting mask exhibits a mask image, where transmission or reflection of light to or from a built surface achieved in the mask area corresponding to a boundary area between plotted areas (an overlap) becomes lower than that achieved in the other mask area. Thereby, the intensity of light radiated onto the boundary area between the adjacent plotted areas is made equal to or analogous to the intensity of light radiated onto areas other than the boundary area, thereby preventing excessive optical-curing of the boundary areas (the overlap) between the plotted areas. Alternatively, a computer has been previously programmed such that a curved mask image is formed in a mask area corresponding to a boundary area between plotted areas, whereby the boundary area is formed in a curved manner. In any case, lines, streaks, ridges, or the like, can be prevented from arising in the areas corresponding to the boundaries in a finally-obtained stereolithographic three-dimensional object, and a stereolithographic three-dimensional object that has superior appearance, superior dimensional accuracy and is free from unevenness in strength and hardness can be obtained.

In the optical building apparatus shown in FIGS. 5 to 9, the light source 1 or the light transmission means 7, the rod lens 8, the imaging lens 9, the reflection mirror 10, the light-condensing lens 2, the planar plotting mask 3a or 3b, and the projection lens 4 are designed so as to be continuously moved (continuously moved in the direction of arrow shown in FIGS. 5 to 9) in an integrated fashion with respect to the building surface 5 (the surface of the photocurable resin composition), by moving means (not shown) during the optical building operation for forming an optically-cured resin layer by exposing the surface of the photocurable resin composition.

As mentioned previously, the building surface 5 (the surface of the photocurable resin composition) is exposed to light while the mask image (mask pattern) of the planar plotting mask 3 (3a, 3b, and the like) is continuously, dynamically changed in synchronism with continuous movement of the planar plotting mask 3 (3a, 3b, and the like) in accordance with the information which has previously been stored in a computer, or the like, and pertains to a mask image and in association with a predetermined cross-sectional profile pattern of an optically-cured resin layer to be formed as illustrated in, e.g., FIG. 9. Thus, the optically-cured resin layer (exposure image 6) having a predetermined cross-sectional profile is continuously formed.

FIG. 9 illustrates a series of operations performed when optical building of the present invention is performed by use of the planar plotting mask 3 (the planar plotting mask 3 whose width is essentially half that of the building surface 5 in the case shown in FIG. 9) whose width is smaller than the entire width (or the entire width of the building surface 5) of the predetermined optically-cured cross-sectional profile pattern (exposure image 6) to be formed.

First, as shown in (1) of FIG. 9, at commencement of optical building the planar plotting mask 3 and the projection lens 4 are situated such that the tip end of moving light comes to an end portion 5a of the building surface 5. Next, as shown in (2) to (5) in FIG. 9, the light source 1 (or the light transmission means 7), the light-condensing lens 2, the planar plotting mask 3, and the projection lens 4 are continuously moved in parallel with the building surface 5 toward the other end portion 5a of the building surface 5. At that time, the light corresponding to the mask image is radiated onto the building surface 5, to thus form the exposure image 6 while the mask image is being continuously, dynamically changed in accordance with a predetermined cross-sectional pattern to be formed. When the optical building operation has proceeded to a stage (5) shown in FIG. 9, the half of the exposure image 6 of the predetermined cross-sectional profile pattern to be formed is formed. In that stage, the light source 1 (or the light transmission means 7), the light-condensing lens 3, the planar plotting mask 3, and the projection lens 4 are moved to the remaining half of the building surface 5 [(6) in FIG. 9]. As shown in (6) to (10) in FIG. 9, the optical building operation analogous to those mentioned previously is repeated from the end portion 5b of the building surface 5 to the end portion 5a of the same. By means of this operation, there is formed the optically-cured resin layer (the exposure image 6) for one layer having a predetermined cross-sectional profile pattern to be formed.

Figure 10:
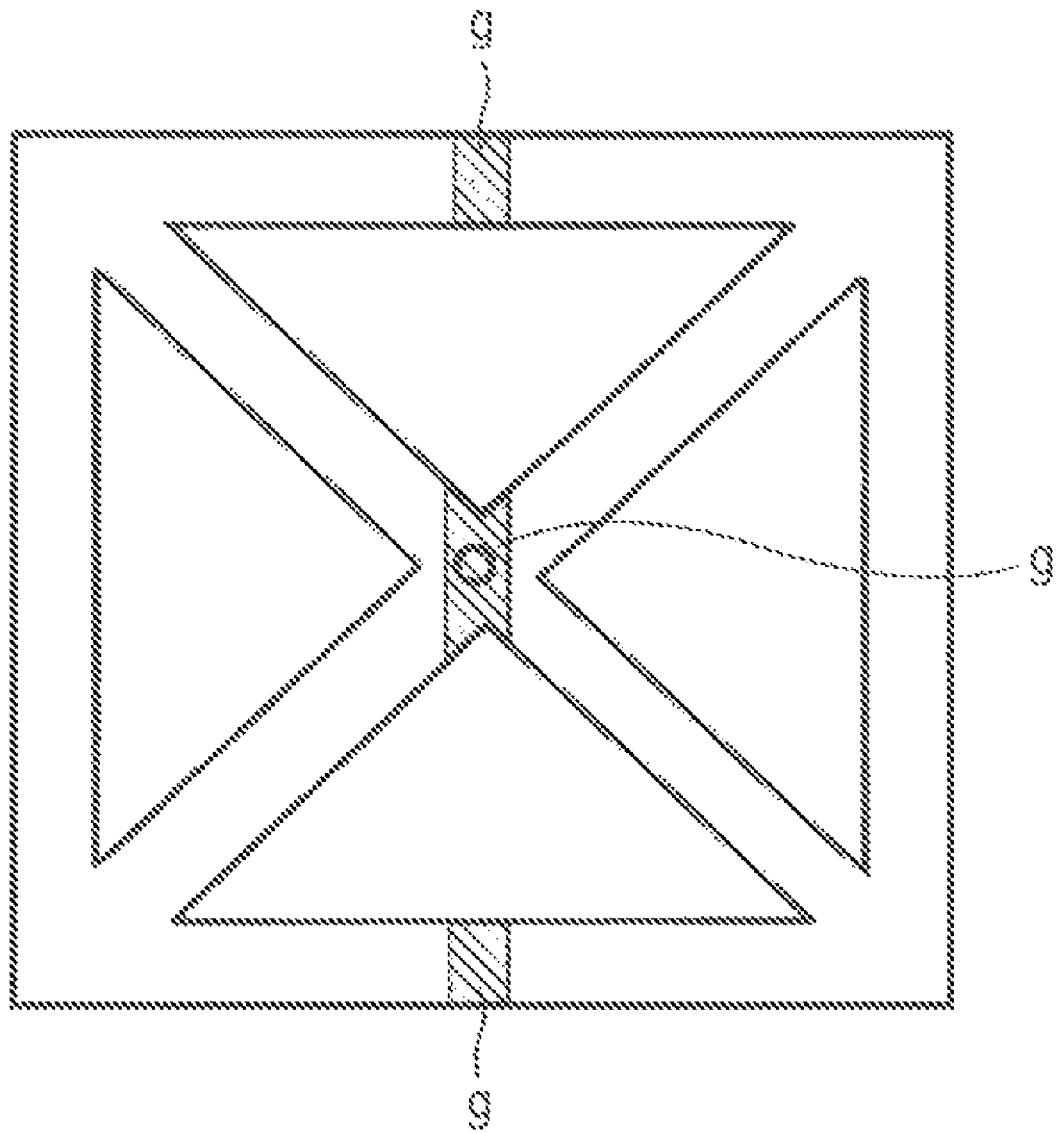
FIG. 10 is a view showing a cross-sectional profile pattern formed under the stereolithographic method shown in FIG. 9.

In the case of the optical building method shown in FIG. 9, the thus-obtained stereolithographic three-dimensional object has a cross-sectional profile shown in FIG. 10. As shown in FIG. 10, a boundary area (overlap) "g" is formed between the right-half optically-cured building pattern section, which is formed by means of the series of continuous movement of the planar plotting mask 3 and exposure indicated by (1) to (5) shown in FIG. 9, and the left-half optically-cured building pattern section, which is formed by the series of continuous movement of the planar plotting mask 3 and exposure indicated by (6) to (10) shown in FIG. 9. Accordingly, the total intensity of light radiated onto the boundary area (overlap) "g" is made equal or analogous to the intensity of light radiated onto the area other than the boundary area (overlap) [the method (i)], the shape of the boundary area "g" is made curved [the method (ii)], and/or the position of the boundary area (overlap) "g" is staggered among the vertically-stacked optically-cured resin layers [the method (iii)]. Thereby, occurrence of lines, streaks, ridges, or the like, in the area corresponding to the overlap "e" in the finally-obtained stereolithographic three-dimensional object can be prevented or diminished. Accordingly, a stereolithographic three-dimensional object which has superior appearance and dimensional accuracy and is free from unevenness in strength and hardness can be obtained.

On the occasion of performing a series of optical building operations illustrated in FIG. 9, the speed of continuous movement of the light source 1 (or the light transmission means 7), that of the light-condensing lens 2, that of the planar plotting mask 3, and that of the projection lens 4 are preferably made uniform at the time of formation of the optically-cured resin layer (the exposure image 6) for one layer (i.e., during continuous building operation). Further, the intensity of light reaching the building surface 5 by way of the planar plotting mask 3 and the projection lens 4 preferably remains unchanged in the area other than the boundary area (the overlap) during the optical building operation.

In the case of the optical building method of the present invention where optical building is performed while the mask image of the planar plotting mask 3 is continuously, dynamically changed in accordance with the cross-sectional profile pattern of the optically-cured resin layer (the exposure image 6) to be formed and in synchronism with continuous movement of the planar plotting mask 3, the planar plotting mask 3, which is smaller than the predetermined cross-sectional profile pattern (the exposure image 6) as can be seen in, e.g., FIG. 9, is used. Thus, various sizes of stereolithographic three-dimensional objects from a small one to a large one can be smoothly manufactured readily and with high building accuracy while a distance between adjacent microdot areas projected by the planar plotting mask 3 on the surface of the photocurable resin composition is maintained small. In addition, individual sections (indicated by, e.g., 6a in FIG. 9) of the exposure image 6 (the optically-cured resin layer) formed by exposure are not cured by mere single exposure. The exposure image is continuously exposed during the period of time in which the light of the dynamic predetermined pattern, which is radiated on the building surface 5 by way of the projection lens 4 and is continuously changed, completely finishes passing through the individual sections (e.g., the section 6a), whereby the optically-cured resin layer is formed. Therefore, in the case of the present invention, sufficient optical curing can be performed even when the travel speed of radiation light achieved during optical building is increased, and a target stereolithographic three-dimensional object can be manufactured with superior productivity within a short period of time. Moreover, in the case of the present invention, the amount of light radiated onto the individual sections of the formed exposure image 6 (the optically-cured resin having the predetermined cross-sectional profile pattern) is made uniform by means of continuous radiation. Hence, discontinuity between adjacent exposed areas and non-uniform radiation, which have been caused by the conventional technique of radiating light with the planar plotting mask 3 remaining stationary, do not arise. The overall cross-sectional profile pattern is exposed uniformly without unevenness, and the dimensional accuracy and building accuracy of the stereolithographic three-dimensional object are enhanced, and unevenness in strength are eliminated. Thus, superior appearance is attained.

Moreover, in the case of the present invention, optical building can be performed by means of scaling-down a projected screen, so that plotting resolution can be enhanced correspondingly. When the projected screen is scaled down, the intensity of light per unit area in the plot section is increased, there is yielded an advantage of the ability to shorten exposure time of an exposure section. For instance, on the assumption that a photocurable resin composition having a curing sensitivity of 5 mJ is used and that an image 1 mW/cm2 is formed by collectively exposing the photocurable resin composition to a size of 250 mm·250 mm by use of a stationary (fixed) planar plotting mask, the exposure time required in this case is 5 sec. This image (the area of exposure) is scaled down to size (125 mm·125 mm), and an exposure layer equal in size to 250 mm·250 mm is finally formed by the method of the present invention (the method for continuously moving the planar plotting mask and continuously, dynamically changing the mask image in synchronism with continuous movement of the planar plotting mask). In such a case, the plotting resolution becomes quadrupled when compared with a case where the exposure layer is collectively exposed with the planar plotting mask remaining stationary (fixed). Further, the intensity of light per unit area is also quadrupled to 4 mW/cm2 when compared with the case of collective exposure. At that time, the time required to expose the area of 250 mm·250 mm by means of continuous movement is five seconds as in the case of collective exposure. In other words, as a result of the method of the present invention being practiced by use of the scale-down optical system, the building accuracy can be enhanced by far within the same period of building time as that achieved in the case where collective exposure is effected by use of the stationary planar plotting mask.

First Embodiment

An optical building apparatus, which is shown in FIG. 5 and has a 120 W extra high voltage mercury lamp as the light source 1 and a liquid-crystal of TFT-type VGA (640·480 pixels) manufactured by Casio Computer Co., Ltd., is used. Further, CPX-1000 (a curing sensitivity of 2.5 mJ) manufactured by CMET Inc. is used as a photocurable resin composition. Under the conditions of a (rectangular) projection size of 28.8 mm (in the advancing direction of the apparatus)·38.4 mm (in the direction orthogonal to the advancing direction) on the building surface 5 (the surface of the photocurable resin composition) and a light energy intensity of 2.5 mW/cm2 on the building surface 5, the light source 1, the rod lens 8, the imaging lens 9, the reflection mirror 10, the light-condensing lens 2, the planar plotting mask 3, and the projection lens 4 are continuously moved, in an integrated fashion, in the advancing direction in parallel to the building surface 5 at a speed of 28.8 mm/sec. During movement, the mask image of the planar plotting mask 3 formed from liquid-crystal is continuously, dynamically changed in accordance with the cross-sectional profile pattern to be formed, to thus manufacture a stereolithographic three-dimensional object having a cross-sectional profile pattern shown in FIG. 10 (height·width·depth=70 mm·70 mm·15 mm). During this optical building operation, the time during which the individual sections of the optically-cured layer are exposed was 7 sec, and the amount of light radiated onto the area other than the boundary area (overlap) was 2.5 mJ. The width of the boundary area (overlap) "g" between the right plotted area and the left plotted area in FIG. 10 is 6.8 mm. The amount of light radiated on the boundary area (overlap) "g" was 1.25 mJ as a result of the display of the liquid-crystal achieved during the respective continuous movement and exposure processes being provided with gradation. The total amount of light radiated onto the boundary area (the overlap) "g" in the finally-formed optically-cured cross-sectional profile pattern was 2.5 mJ as achieved in the other area. Thus, an stereolithographic three-dimensional object where no lines, streaks, or ridges appear in the area corresponding to the boundary area (overlap) "g" and which has superior appearance and dimensional accuracy, no unevenness in hardness, and superior strength could be smoothly manufactured at high building rate.

Although the present invention has been described in detail by reference to the specific embodiments, it is apparent for the skilled in the art that the present invention can be subjected to various alterations or corrections without departing from the spirit and scope of the present invention.

The present patent application is based on Japanese Patent Application (JP-A-2003-319572) filed on Sep. 11, 2003, and incorporated herein by reference.

INDUSTRIAL APPLICABILITY

The stereolithographic method and apparatus of the present invention can be effectively used for manufacturing a high-quality, stereolithographic three-dimensional object with high building accuracy, at high building speed, and with superior productivity, wherein none of undesirable lines, streaks, and ridges appear in the surface of the three-dimensional object, and the three-dimensional object has superior appearance and dimensional accuracy and is free from unevenness in strength and hardness.

The stereolithographic method and apparatus of the present invention can be effectively used for manufacturing various types of stereolithographic three-dimensional objects from a small one to a large one.

The method and apparatus of the present invention enable smooth manufacture of a model or machining model used for producing precision components, electrical/electronic components, furniture, a building construction, automotive parts, various containers, castings, metal dies, master blocks; parts used for designing a complicate heat medium circuit; parts used for analyzing and planning the behavior of a heat medium of complicate structure; and other various types of stereolithographic three-dimensional objects having complicate shapes and structures at high building rate and with high dimensional precision.

The invention claimed is:

1. A stereolithographic method for forming a stereolithographic three-dimensional object by sequentially repeating, until a predetermined stereolithographic three-dimensional object is formed, optical building processes of exposing a surface of a photocurable resin composition layer by way of a planar plotting mask to thus form an optically-cured resin layer having a predetermined cross-sectional profile pattern; applying a photocurable resin composition layer over the optically-cured resin layer; and exposing the surface of the photocurable resin composition layer to light by way of the planar plotting mask, to thus further form an optically-cured resin layer having a predetermined cross-sectional profile pattern, the method comprising:

using a planar plotting mask, which can continuously change a mask image, as the planar plotting mask;

performing a building operation of continuously moving the planar plotting mask over plotted areas on the surface of the photocurable resin composition layer such that overlaps are formed between adjacent ones of the plotted areas during at least one of the optical building processes and of exposing the surface of the photocurable resin composition layer to light by way of the planar plotting mask while continuously changing a mask image of the planar plotting mask in accordance with a cross-sectional profile pattern of an optically-cured resin layer to be formed and in synchronism with movement of the planar plotting mask, to thus form an optically-cured resin layer having a predetermined cross-sectional profile pattern; and performing the optical building processes such that a computer is utilized to generate mask images to attenuate a visual noticeability of the overlaps between the adjacent plotted areas in the optically-cured resin layer in a finally-obtained stereolithographic three-dimensional object by making a total intensity of light radiated onto the overlaps between the adjacent plotted areas in the optically-cured resin layer equal or analogous to the intensity of light radiated onto areas other than the overlaps.

2. The stereolithographic method according to claim 1, wherein the planar plotting mask is a planar plotting mask in which a plurality of micro-optical shutters capable of blocking or allowing transmission of light into microdot areas are arranged in a planar manner; and the surface of the photocurable resin composition is exposed to light while a mask image is continuously changed in accordance with a cross-sectional profile pattern to be formed by means of the plurality of micro-optical shutters during continuous movement of the planar plotting mask.

3. The stereolithographic method according to claim 2, wherein the planar plotting mask is a planar plotting mask where a liquid-crystal shutter or a digital micromirror shutter is arranged in a planar manner.

4. The stereolithographic method according to claim 1, wherein the attenuation of the visual noticeability of the overlaps between the adjacent plotted areas in the optically cured resin layer in a finally-obtained stereolithographic three-dimensional object results in the overlaps being unnoticeable to the human eye.

5. The stereolithographic method according to claim 1, further comprising making a shape of the overlaps between the adjacent plotted areas in the optically-cured resin layer curved, to attenuate a visual noticeability of the overlaps between the adjacent plotted areas in the optically-cured resin layer in a finally-obtained stereolithographic three-dimensional object.

6. The stereolithographic method according to claim 1, further comprising staggering positions of the overlaps between the adjacent plotted areas in the optically-cured resin layer in vertically-stacked optically-cured resin layers, to attenuate a visual noticeability of the overlaps between the adjacent plotted areas in the optically-cured resin layer in a finally-obtained stereolithographic three-dimensional object.

7. A stereolithographic method for forming a stereolithographic three-dimensional object by sequentially repeating, until a predetermined stereolithographic three-dimensional object is formed, optical building processes of exposing a surface of a photocurable resin composition layer by way of a planar plotting mask to thus form an optically-cured resin layer having a predetermined cross-sectional profile pattern; applying a photocurable resin composition layer over the optically-cured resin layer; and exposing the surface of the photocurable resin composition layer to light by way of the planar plotting mask, to thus further form an optically-cured resin layer having a predetermined cross-sectional profile pattern, the method comprising:

using a planar plotting mask, which can continuously change a mask image, as the planar plotting mask;

performing a building operation of continuously moving the planar plotting mask over plotted areas on the surface of the photocurable resin composition layer such that overlaps are formed between adjacent ones of the plotted areas during at least one of the optical building processes and of exposing the surface of the photocurable resin composition layer to light by way of the planar plotting mask while continuously changing a mask image of the planar plotting mask in accordance with a cross-sectional profile pattern of an optically-cured resin layer to be formed and in synchronism with movement of the planar plotting mask, to thus form an optically-cured resin layer having a predetermined cross-sectional profile pattern; and performing the optical building processes such that a computer is utilized to generate mask images to attenuate a visual noticeability of the overlaps between the adjacent plotted areas in the optically-cured resin layer in a finally-obtained stereolithographic three-dimensional object by making a shape of the overlaps between the adjacent plotted areas in the optically-cured resin layer curved, or by staggering positions of the overlaps between the adjacent plotted areas in the optically-cured resin layer in vertically-stacked optically-cured resin layers.

8. The stereolithographic method according to claim 7, wherein the shape of the overlaps between the adjacent plotted areas in the optically-cured resin layer is made curved.

9. The stereo lithographic method according to claim 7, wherein the positions of the overlaps between the adjacent plotted areas in the optically-cured resin layer are staggered in vertically-stacked optically-cured resin layers.

\* \* \* \* \*